US009224283B2

(12) United States Patent
Kaneko

(10) Patent No.: US 9,224,283 B2
(45) Date of Patent: Dec. 29, 2015

(54) SUBSTRATE PROCESSING APPARATUS, ALARM MANAGEMENT METHOD OF SUBSTRATE PROCESSING APPARATUS, AND STORAGE MEDIUM

(71) Applicant: Tokyo Electron Limited, Tokyo (JP)

(72) Inventor: Tomohiro Kaneko, Koshi (JP)

(73) Assignee: Tokyo Electron Limited, Minato-Ku (JP)

( * ) Notice: Subject to any disclaimer, the term of this patent is extended or adjusted under 35 U.S.C. 154(b) by 0 days.

(21) Appl. No.: 14/003,903

(22) PCT Filed: Sep. 27, 2012

(86) PCT No.: PCT/JP2012/074874
§ 371 (c)(1),
(2) Date: Sep. 9, 2013

(87) PCT Pub. No.: WO2013/047651
PCT Pub. Date: Apr. 4, 2013

(65) Prior Publication Data
US 2014/0203941 A1 Jul. 24, 2014

(30) Foreign Application Priority Data
Sep. 29, 2011 (JP) ................................ 2011-215099

(51) Int. Cl.
*G08B 21/18* (2006.01)
*G05B 23/02* (2006.01)
(52) U.S. Cl.
CPC .............. *G08B 21/18* (2013.01); *G05B 23/027* (2013.01)
(58) Field of Classification Search
None
See application file for complete search history.

(56) References Cited

U.S. PATENT DOCUMENTS

| 3,927,308 | A | * | 12/1975 | Summers et al. ............. 702/199 |
| 4,303,973 | A | * | 12/1981 | Williamson et al. ............ 700/84 |
| 5,265,131 | A | * | 11/1993 | Scarola et al. ................ 376/259 |
| 5,859,885 | A | * | 1/1999 | Rusnica et al. ............... 376/259 |
| 2001/0026225 | A1 | * | 10/2001 | Young .......................... 340/606 |
| 2003/0128126 | A1 | * | 7/2003 | Burbank et al. .............. 340/605 |
| 2005/0007249 | A1 | * | 1/2005 | Eryurek et al. ............... 340/511 |
| 2008/0120080 | A1 | * | 5/2008 | Nasle .............................. 703/13 |
| 2008/0209033 | A1 | * | 8/2008 | Ginter et al. .................. 709/224 |

(Continued)

FOREIGN PATENT DOCUMENTS

| JP | 05-333186 A1 | 12/1993 |
| JP | 11-307612 A1 | 11/1999 |

(Continued)

OTHER PUBLICATIONS

International Search Report dated Dec. 18, 2012.

*Primary Examiner* — Julie Lieu
(74) *Attorney, Agent, or Firm* — Burr & Brown, PLLC

(57) ABSTRACT

A substrate processing apparatus is provided with: a detection unit that detects a factor for which interlock is applied to one or more of a plurality of modules and outputs a detection signal; interlocking management unit that, based on the detection signal output from the detecting units, applies interlock to the module to be interlocked if the factor has been occurred; and an alarm management unit that determines parent-child relationships between a parent alarm indicating that the factor for which interlock is applied has been detected, and child alarms each indicating that interlock has been applied to each module, and causes a display unit to display in a grouped manner the parent alarm and the child alarm or alarms having the parent-child relationship.

9 Claims, 22 Drawing Sheets

(56) References Cited

U.S. PATENT DOCUMENTS

| | | | |
|---|---|---|---|
| 2008/0255681 A1* | 10/2008 | Scott et al. | 700/12 |
| 2008/0300698 A1* | 12/2008 | Havekost et al. | 700/83 |
| 2009/0063122 A1* | 3/2009 | Nasle | 703/18 |
| 2009/0273470 A1* | 11/2009 | Sinkevicius et al. | 340/539.26 |
| 2010/0004759 A1* | 1/2010 | Scott et al. | 700/12 |
| 2011/0010654 A1* | 1/2011 | Raymond et al. | 715/772 |
| 2013/0253718 A1* | 9/2013 | Meagher et al. | 700/291 |
| 2015/0057821 A1* | 2/2015 | Nasle | 700/291 |

FOREIGN PATENT DOCUMENTS

| | | |
|---|---|---|
| JP | 2005-276046 A1 | 10/2005 |
| JP | 2011-118739 A1 | 6/2011 |

* cited by examiner

| MODULE | TRANSFER SYSTEM | EXHAUST SYSTEM | CHEMICAL SOLUTION SYSTEM |
|---|---|---|---|
| 201 | 1 | 1 | 1 |
| 202 | | | |
| 203 | | | |
| 204 | | | |
| 205 | | | |
| 206 | | 2 | 2 |
| 207 | | | |
| 208 | | | |
| 209 | | | |
| 210 | | | |
| 301 | | 3 | 3 |
| 302 | | | |
| 303 | | | |
| 304 | | | |
| 305 | | | |
| 306 | | 4 | 4 |
| 307 | | | |
| 308 | | | |
| 309 | | | |
| 310 | | | |

FIG. 5

SUBSTRATE PROCESSING APPARATUS, ALARM MANAGEMENT METHOD OF SUBSTRATE PROCESSING APPARATUS, AND STORAGE MEDIUM

TECHNICAL FIELD

The present invention relates to a technique for managing alarms in a substrate processing apparatus.

BACKGROUND ART

Substrate processing apparatuses have been utilized in the production of a laminated structure of an integrated circuit for the surface of a semiconductor wafer (hereinafter called wafer) which is a substrate, or in the manufacture of FPD (Flat Panel Display) or PV (Photo Voltaic) panel and the like. Such substrate processing apparatuses perform, on a substrate, various kinds of processing such as a film forming process, an etching process, coating of a resist film in a photolithography process, and a development process.

A substrate processing apparatus is adapted to monitor the operating status of the apparatus by an operation display on which information obtained from various sensors provided in the substrate processing apparatus, setting values of control parameters for a process recipe, etc. are displayed.

As one of important information for the monitoring of the operating status of the substrate processing apparatus, there is an alarm to be activated or triggered in the cases of a control parameter falling outside the set range or the sensor having detected an abnormality of the apparatus. This alarm includes information indicating the location of occurrence of the abnormality, its details and like. If the appropriate action responsive to such information is taken, the operating status of the substrate processing apparatus can be kept normal and damage to the substrate processing apparatus can be prevented.

Once an alarm is triggered, in many cases, it will be deactivated from its triggered state by executing a predetermined recovery (restoration) operation. Further, there are cases in which when a plurality of alarms are activated or triggered, in order to prevent oversight of each alarm and failure of the recovery operation, all alarms are displayed in time-series order and so long as the recovery operation necessary for each alarm is not executed the triggered state of all alarms cannot be eliminated.

Examples of substrate processing apparatuses include one in which when one factor for which interlock is applied occurs, the interlock is activated by a plurality of devices in the substrate processing apparatus, so that they are set to stop. In this case, several tens of alarms or more are trigged in a short time. In this case, the alarm that requires the actual treatment is only one alarm for notifying the factor for which the interlock is applied. If this factor is eliminated, the recovery operation necessary for other alarms may be just simple like, for example, an instruction input of "processing continue", or an instruction input of alarm's "display delete". Even in such a case, an operator bears a large burden where the recovery operation of each one of several tens of alarms is executed while confirming the same.

There has been described in JPH11-307612A (Paragraphs 0054 to 0055, FIG. 9, etc.), a substrate processing apparatus which displays on an operation display (alarm screen), the time of occurrence of trouble generated during the processing of a substrate or the like, the location of its occurrence and the name of each alarm (warning), and operation buttons (alarm restart button and cancel restart button) that execute the recovery operation corresponding to the type of alarm. A technology for efficiently managing a plurality of alarms has however not been described in JP-A-11-307612.

SUMMARY OF THE INVENTION

The present invention provides a substrate processing apparatus capable of efficiently executing the recovery of a plurality of alarms, an alarm management method of the substrate processing apparatus, and a storage medium storing the method therein.

The present invention provides a substrate processing apparatus equipped with a plurality of modules, which includes: a detection unit that detects a factor for which interlock is applied to one or more of the plurality of modules, and that outputs a detection signal; interlock means that, based on the detection signal output from the detection unit, applies interlock to the module to be interlocked where the factor has occurred; and an alarm management unit that determines a parent-child relationship between a parent alarm and a child alarm or alarms, and that causes a display unit to display in a grouped manner the parent alarm and the child alarm or alarms having the parent-child relationship, the parent alarm indicating that the factor for which the interlock is applied has been detected, while the child alarm indicating that the interlock has been applied to the module.

The interlock means may include an interlock management unit that, based on the detection signal output from the detection unit, outputs an interlock instruction signal to the module to be interlocked if the factor has occurred, and outputs the parent alarm to the alarm management unit, and module controllers, provided in the respective modules, that each applies interlock to the corresponding module, based on the interlock instruction signal from the interlock management unit, and that each outputs the child alarm associated with the corresponding module to the alarm management unit.

Alternatively, the interlock means may include an interlock management unit that, based on the detection signal from the detection unit, outputs the parent alarm to the alarm management unit if the factor has occurred, and module controllers, provided in the respective modules, that each applies interlock to the corresponding module, based on the detection signal received from the detection unit, and that each outputs the child alarm associated with the corresponding module to the alarm management unit.

In one embodiment, the alarm management unit has a batch recovery function of collectively recovering the parent and child alarms in the parent-child relationship displayed in a grouped manner. Further, the alarm management unit may also be provided with, in addition to the batch recovery function, an individual recovery function allowing the recovery of each child alarm independently from the recovery of the parent alarm. In this case, the substrate processing apparatus is further provided with a selection unit which selects the execution of the batch recovery function or the execution of the individual recovery function.

Further, the present invention provides an alarm management method of a substrate processing apparatus having a plurality of modules, which includes: detecting a factor for which interlock is applied to one or more of the plurality of modules, and outputting a detection signal; sending a parent alarm indicating that the factor for which the interlock is applied has been detected to an alarm management unit; applying, based on the detection signal, interlock to the module to be interlocked if the factor has occurred; sending a child alarm indicating that the interlock has been applied to the module to be interlocked, to the alarm management unit; and determining a parent-child relationship between the parent and child alarms by the alarm management unit, and causing a display unit to display in a grouped manner the parent alarm and the child alarm or alarms which are determined to have the parent-child relationship.

According to the present invention, the parent-child relationship between alarms is determined by an alarm management unit, and the alarms determined to be in the parent-child relationship are grouped and displayed. It is therefore possible to efficiently execute the recovery of plural alarms.

BRIEF DESCRIPTION OF THE DRAWINGS

FIG. 5 is an explanatory diagram of conveyance, exhaust and chemical solution systems shared by the liquid processing module.

DETAILED DESCRIPTION OF THE INVENTION

A description will hereinafter be made of a liquid processing apparatus 1 illustrated as one example of a substrate processing apparatus according to an embodiment, which performs cleaning of the surface of a wafer W as a substrate.

Figure 1:
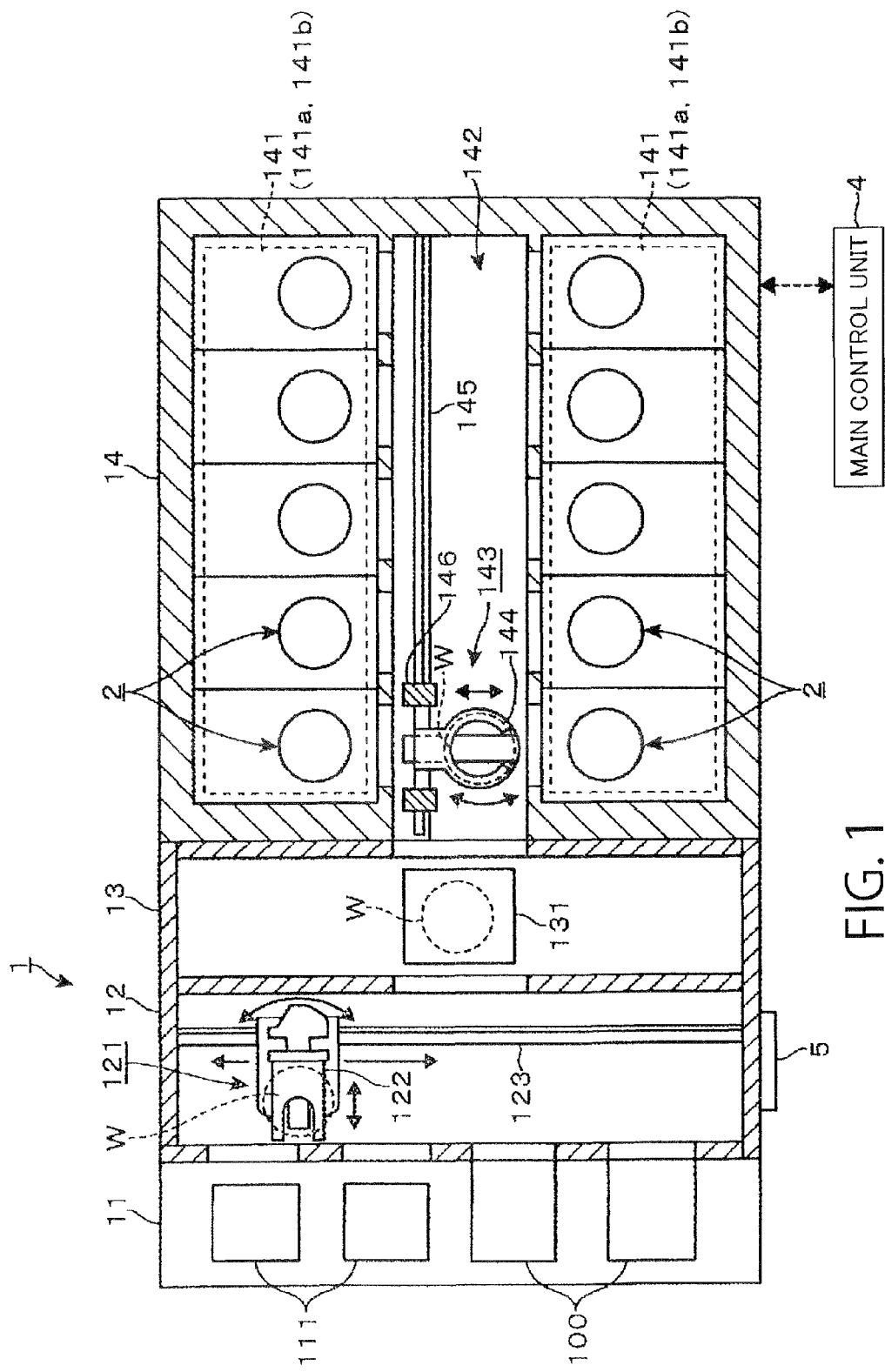
FIG. 1 is a transverse sectional view of a liquid processing apparatus according to one embodiment of the present invention.
Figure 2:
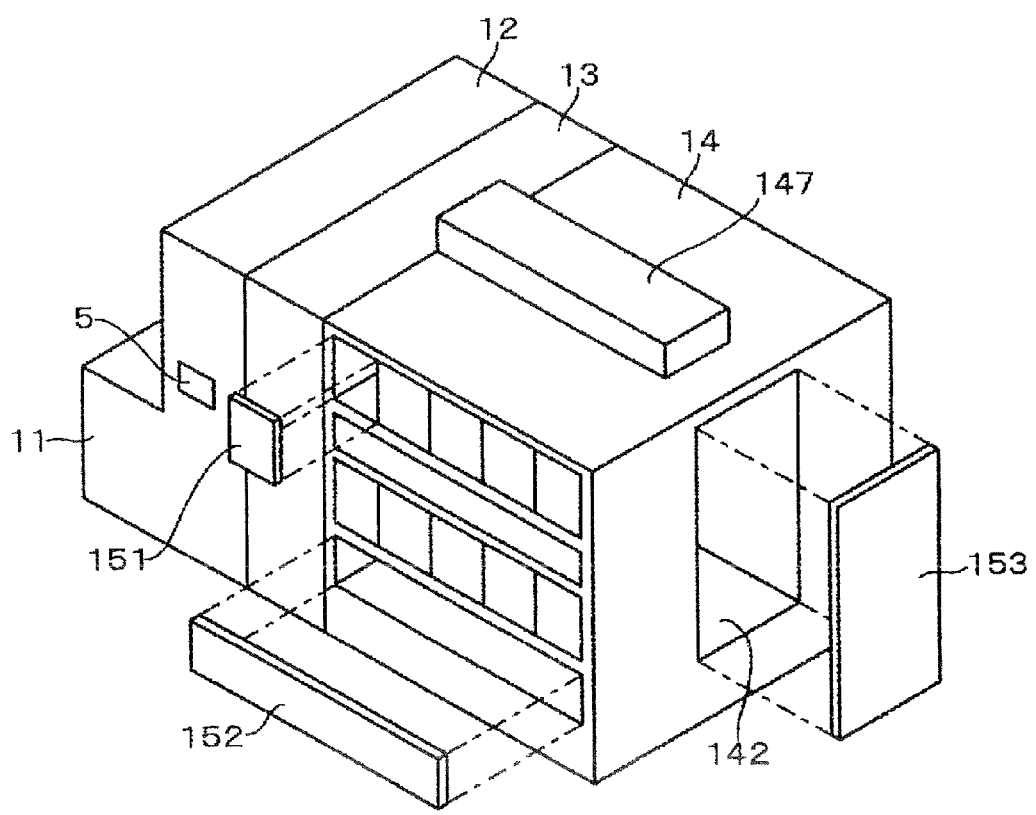
FIG. 2 is a perspective view showing the appearance of the liquid processing apparatus.

As shown in FIGS. 1 and 2, the liquid processing apparatus 1 is equipped with a placement block 11 on which a FOUP100 that is a carrier containing a plurality of wafers W therein is placed, a carry-in/out block 12 which performs the carrying-in/out of the wafer W from the FOUP100 placed on the placement block 11, a delivery block 13 which performs loading and unloading of the wafer W between the carry-in/out block 12 and a liquid processing block 14 of a subsequent stage, and the liquid processing block 14 for applying a liquid treatment to the wafer W. The placement block 11, the carry-in/out block 12, the delivery block 13 and the liquid processing block 14 are provided adjacent to each other in this order.

The placement block 11 has a placement table 111 which places thereon the FOUP100 that houses a plurality of wafers W in a horizontal state. In the carry-in/out block 12, the transfer of the wafer W delivered out from the FOUP100 is performed. The delivery of the wafer W is performed by the delivery block 13. The carry-in/out block 12 and the delivery block 13 have been contained in a single housing.

The carry-in/out block 12 has a first wafer transfer module 121. The first wafer transfer module 121 has a transfer arm 122 which holds the wafer W, and a mechanism which moves back and forth the transfer arm 122. The first wafer transfer module 121 also has a mechanism moved along a horizontal guide 123 (refer to FIG. 1) that extends in the arrangement direction of the FOUP100, a mechanism moved along a vertical guide (not shown) provided in the vertical direction, and a mechanism which rotates the transfer arm 122 in a horizontal plane. By the first wafer transfer module 121, the wafer W is transferred between the FOUP100 and the deliver block 13.

The delivery block 13 has a delivery shelf 131 capable of placing the wafer W thereon. In the delivery block 13, the delivery of the wafer W is performed between the carry-in/out block 12 and the liquid processing block 14 through the delivery shelf 131.

The liquid processing block 14 has a configuration in which a liquid processing unit 141 with a plurality of liquid processing modules 2 disposed therein, and a conveying unit 142 in which the conveyance of the wafer W is performed, are held in a single housing. The conveying unit 142 includes a second wafer transfer module 143 disposed within space extending in a longitudinal direction with a portion connected to the delivery block 13 as a base end. The second wafer transfer module 143 has a transfer arm 144 holding the wafer W, and a mechanism which moves back and forth the transfer arm 144.

Further, the second wafer transfer module 143 has a mechanism that moves along a horizontal guide 145 (refer to FIG. 1) extending in the longitudinal direction, a mechanism that moves along a vertical guide 146 which is provided in the vertical direction, and a mechanism which rotates the transfer arm 144 in the horizontal plane. By the second wafer transfer module 143, the transfer of the wafer W is performed between the delivery shelf 131 and each liquid processing module 2 already described above. Reference numeral 147 in FIG. 2 indicates an FFU which supplies clean air to the space in the liquid processing block 14.

Figure 3:
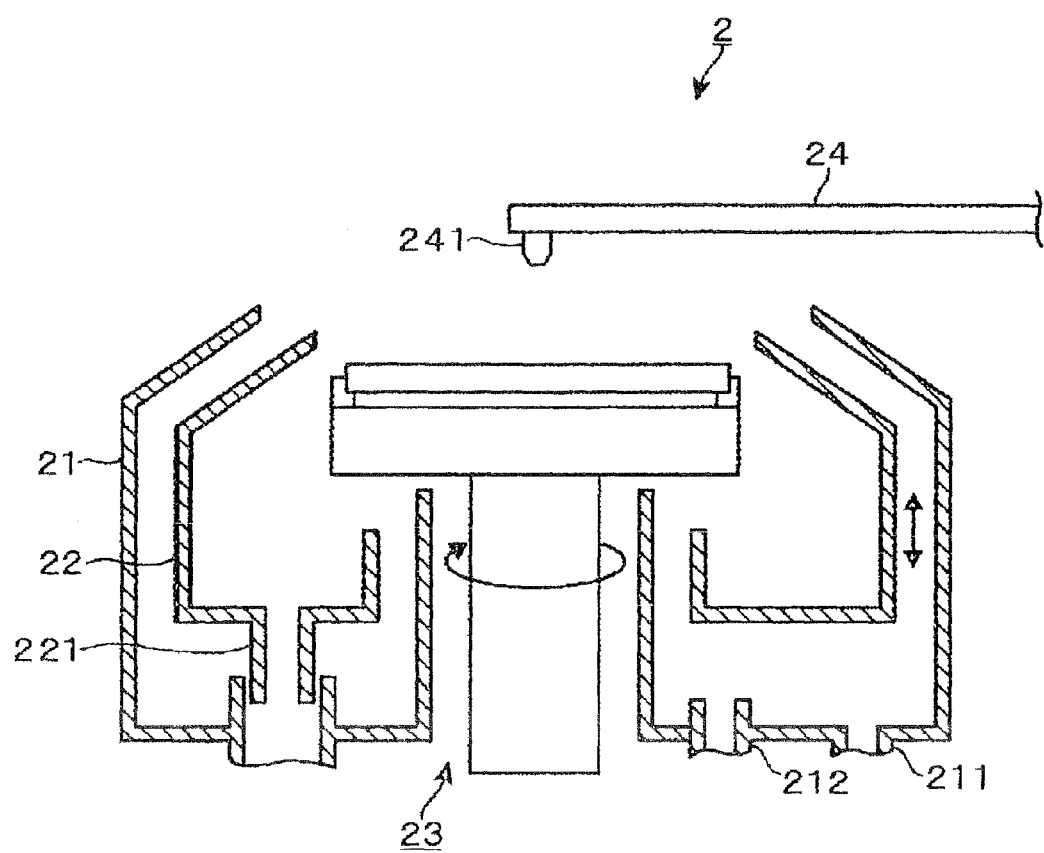
FIG. 3 is a vertical sectional view of a liquid treatment module which is provided in the liquid processing apparatus.

As shown in FIG. 1, the plurality of liquid processing modules 2 are arranged side by side in the liquid processing unit 141 along the direction in which space forming the conveying unit 142 extends. Each liquid processing module 2 can perform the liquid processing of the wafers W one by one by spin processing, for example. As illustrated in the vertical sectional side view of FIG. 3, the liquid processing module 2 substantially horizontally holds the wafer W by means of a wafer holding portion 23 disposed in an outer chamber 21 and rotates the wafer holding portion 23 about the vertical axis to thereby rotate the wafer W. A nozzle arm 24 is made to enter above the rotated wafer W, and treatment liquid and rinsing liquid are supplied from a nozzle portion 241 provided in its distal end in a predetermined order, whereby the liquid processing of the upper surface (front surface where the surface of the wafer W is held toward the top surface and back surface where the back surface thereof is directed to the top surface) of the wafer is performed.

The liquid processing, for example, removal of particles and organic contaminants with an SC1 solution (a mixture of ammonia and hydrogen peroxide solution) that is an alkaline processing solution; then rinse cleaning with deionized water (DeIonized Water: DIW) that is a rinse solution; next removal of a native oxide film with diluted hydrofluoric acid (Diluted HydroFluoric acid: DHF) that is acidic chemical, and subsequently rinse cleaning with DIW are performed. Also upon these processes, physical washing with a brush or liquid spray may be performed. These chemical liquid are received by an outer chamber 21 and an inner cup 22 disposed thereinside and discharged from liquid discharge ports 211 and 221. The atmosphere in the outer chamber 21 is exhausted from an exhaust port 212. When the liquid processing by the chemical solution is finished, IPA (IsoPropyl Alcohol) is supplied to the top surface of the wafer W while rotating the wafer A to perform IPA drying that shakes off the IPA.

The liquid processing modules 2 having the configuration described above are arranged side by side along the space to form the conveying unit 142 as described above. This arrangement state will be described in detail. The liquid processing modules 2 of plural units, here, five units queue up along the conveying unit 142. The lines of the liquid processing modules 2 are provided on both sides with the conveying unit 142 interposed therebetween and stacked in two upper and lower stages. Accordingly, the liquid processing apparatus 1 of the present embodiment is provided with the liquid processing modules 2 being 20 units in total. Reference numeral 141a shown in FIG. 1 indicates a liquid processing portion on the lower stage side, and reference numeral 141b indicates a liquid processing portion on the upper stage side.

Figure 4:
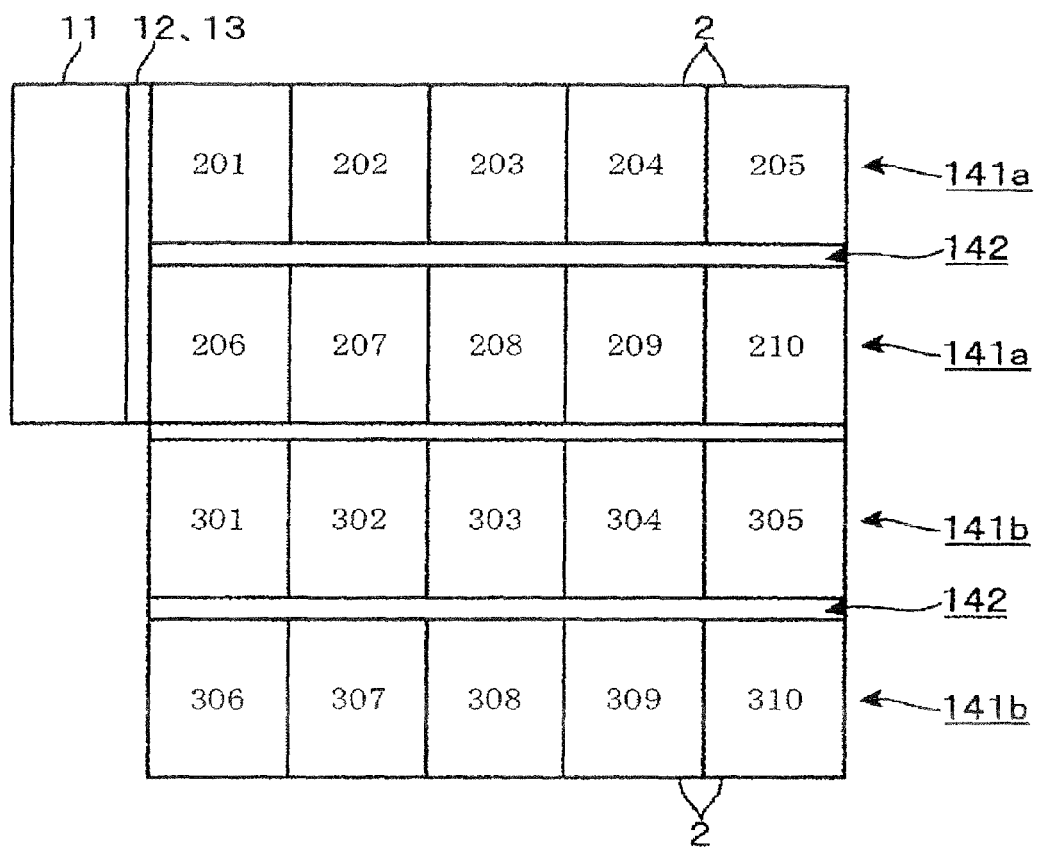
FIG. 4 is a typical diagram showing the arrangement of the liquid processing module.

The twenty liquid processing modules 20 arranged in this manner are assigned management numbers to distinguish the respective liquid processing modules 2. As shown in the typical diagram of FIG. 4, in the liquid processing portion 141a on the lower stage side, the liquid processing modules 2 lying in the left column of the conveying unit 142 as viewed from the placement block 11 are respectively given management numbers of 201 through 205 in order from the placement block 11 side. The liquid processing modules 2 lying in the right column of the conveying unit 142 are given management numbers of 206 through 210 respectively. As for the liquid processing portion 141b on the upper stage side, the liquid processing modules 2 lying in the left column of the conveying unit 142 are denoted by management numbers 301 through 305 respectively, and the liquid processing modules 2 lying in the right column thereof are denoted by management numbers 306 through 310 respectively.

Further, each of these twenty liquid processing modules 2 takes a configuration to share the second wafer transfer module 143 for performing loading and unloading of the wafer W, an exhaust system such as an exhaust pipe connected to the exhaust port 212 of each liquid processing module 2, and a chemical solution supply system for supplying chemical liquid and rinsing liquid to the nozzle portion 241 by the plural liquid processing modules 2. In the present embodiment as shown in the table of FIG. 5, one wafer transfer system (second wafer transfer module 143) is shared by all the liquid processing modules 2.

On the other hand, as for the exhaust systems, one exhaust system is shared every five liquid processing modules 2. The liquid processing modules designated at management numbers 201 through 205, the liquid processing modules designated at management numbers 206 through 210, the liquid processing modules designated at management numbers 301 through 305, and the liquid processing modules designated at management numbers 306 through 310 are respectively connected to the exhaust systems of the first, second, third and fourth systems. Even as for the chemical solution systems, the liquid processing modules 2 grouped as with the exhaust systems are respectively connected to the chemical solution systems corresponding to the respective groups to form first through fourth chemical solution systems.

Further, as shown in FIG. 2, the side wall surface of the housing constituting the liquid processing block 14 is provided with a module side cover 151 at a position where each liquid processing module 2 is housed. Each module side cover 151 is configured detachably from the housing of the liquid processing block 14. A detachable exhaust/chemical solution system side cover 152 is provided for each group shown in FIG. 5 even at a position where the exhaust system from each liquid processing module 2 and the supply system of the chemical solution are accommodated. Further, reference numeral 153 in FIG. 2 indicates a PA (Process Arm) rear side cover provided at the rear end surface of the liquid processing apparatus 1 to access the second wafer transfer module 143 (hereinafter called process arm in terms of alarm management) in the conveying unit 142.

The liquid processing apparatus 1 having the configuration described above is connected to a main control unit 4 as shown in FIG. 1. The main control unit 4 is composed of a computer having a CPU and a storage unit, not shown. A program having incorporated therein step (instruction) groups about control related to the operation of the liquid processing apparatus 1 has been recorded in the storage unit. The operation includes sequentially delivering out the wafers W from the FOUP100, conveying the same to the respective liquid processing modules 2 via the carry-in/out block 12 and the delivery block 13 and performing the liquid processing of each wafer W, and thereafter conveying the wafer W via a path opposite to that at the delivery time and accommodating the same in the FOUP100. This program is stored in a storage medium such as a hard disk, a compact disk, a magneto-optical disk and a memory card. The program is installed on a computer therefrom.

To reduce the burden to the operator at the time of activation or triggering of the plural alarms described in Background Art, the liquid processing apparatus 1 of the present embodiment can collectively execute the recovery operations for these alarms. The construction and operation of the alarm triggering system provided in the liquid processing apparatus 1 to achieve the corresponding function will be described below with reference to FIGS. 6 through 8.

Figure 6:
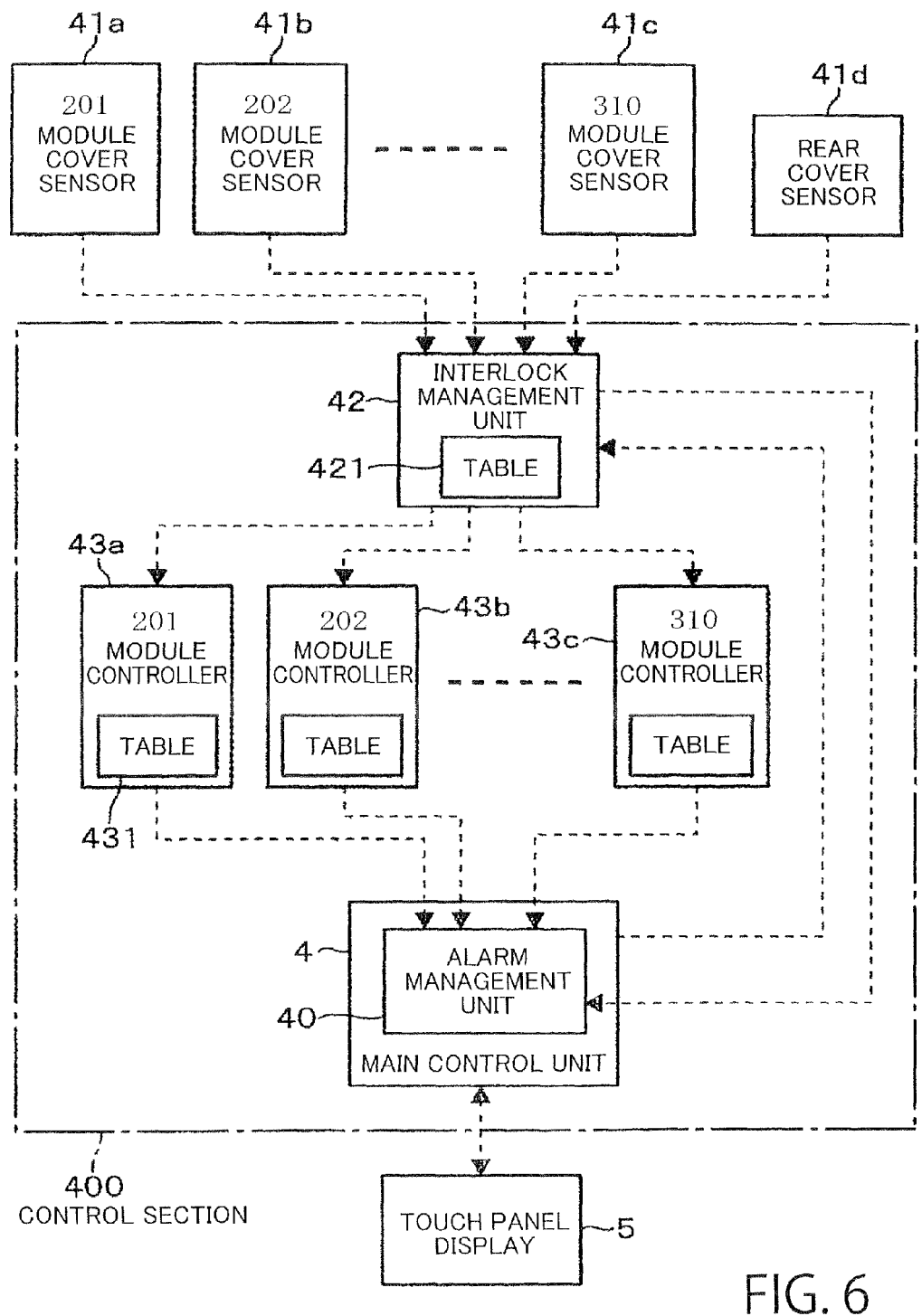
FIG. 6 is a block diagram showing a part of an alarm triggering system of the liquid processing apparatus.

In the substrate processing apparatus used in the semiconductor manufacturing process, like the liquid processing apparatus 1 of the present embodiment, several tens to hundreds of different types of alarms may be set in response to, for example, an occurrence location or the details of trouble. For example, FIG. 6 shows a part of the operating system of interlock to be performed on the liquid processing module and the alarm triggering system accompanying the same system. The system portion shown in FIG. 6 corresponds to the part that executes the function of, when the module side cover 151 and the PA rear side cover 153 of the conveying unit 142 for each liquid processing module 2 shown in FIG. 2 are opened, activating the interlock to stop the liquid processing module 2 at a preset position according to the opened covers 151 and 153 and triggering an alarm therefor.

Each of module cover sensors 41a through 41c is a sensor for detecting the opening of the module side cover 151 which is provided in a position to accommodate each liquid processing module 2. When the module side cover 151 is being closed, each of these sensors 41a through 41c is in a state of being made electrically conductive to an interlock management unit 42. When the conductive state is switched to a disconnected state, it is detected that the module side cover 151 has been brought to an open state.

When it is detected that the module side cover 151 has been opened, to stop the liquid processing module 2 at a position corresponding to the module side cover 151 where each of the module cover sensors 41a through 41c is activated, the interlock management unit 42 outputs an interlock operation command (instruction to put interlock) to each corresponding module controller (43a through 43c). The module controller (43a through 43c) having received the interlock operation command from the interlock management unit 42 stops the operation of each corresponding liquid processing module 2.

On the other hand, a PA rear cover sensor 41d is a sensor for detecting the opening of the PA rear side cover 153 provided on the conveying or transfer system common to all the liquid processing modules 2. As with the module cover sensors 41a through 41c described above, the PA rear cover sensor 41d is in a state of being made electrically conductive to the interlock management unit 42 when the PA rear side cover 153 is closed. The PA rear cover sensor 41d is switched to a disconnected state when the PA rear side cover 153 is opened.

When it is detected that the PA rear side cover 153 has been opened, the interlock management unit 42 takes the setting to stop all the liquid processing modules 2 (modules designated at management numbers 201 through 210 and 301 through 310 (refer to FIG. 5)) that share the transfer system. The interlock management unit 42 outputs the interlock operation command to all the module controllers 43a through 43c.

When the interlock for these is operated, an alarm indicating that each liquid processing module 2 has been stopped by the corresponding interlock is output from each of the module controllers 43a through 43c to an alarm management unit 40. The main control unit 4 is connected to an interface section such as a touch panel display (display unit) 5. The alarm management unit 40 having received the alarm displays the corresponding alarm on the touch panel display 5 and performs alarm's triggering or notification.

When the operator who confirmed the alarm displayed on the touch panel display 5 closes the cover 151, 153 each of which has become an object for the alarm, the detection of closing of these covers 151 and 153 by the cover sensors 41a through 41d is output to the interlock management unit 42 (each of the cover sensors 41a through 41d and the interlock management unit 42 are brought to a conducting state). Further, when the operator carries out a prescribed recovery operation via the touch panel display 5, information indicating that the corresponding recovery operation has been performed is outputted from the main control unit 4 to the interlock management unit 42, where the operating state of the interlock is released.

The cover sensors 41a through 41d correspond to a detection unit for detecting a factor for which interlock is applied to the module or modules in the liquid processing apparatus 1. Further, the interlock management unit 42 and the module controllers 43a through 43c constitutes interlock means for applying interlock onto each module to be interlocked, based on detection signals from the detection units.

Figure 7:
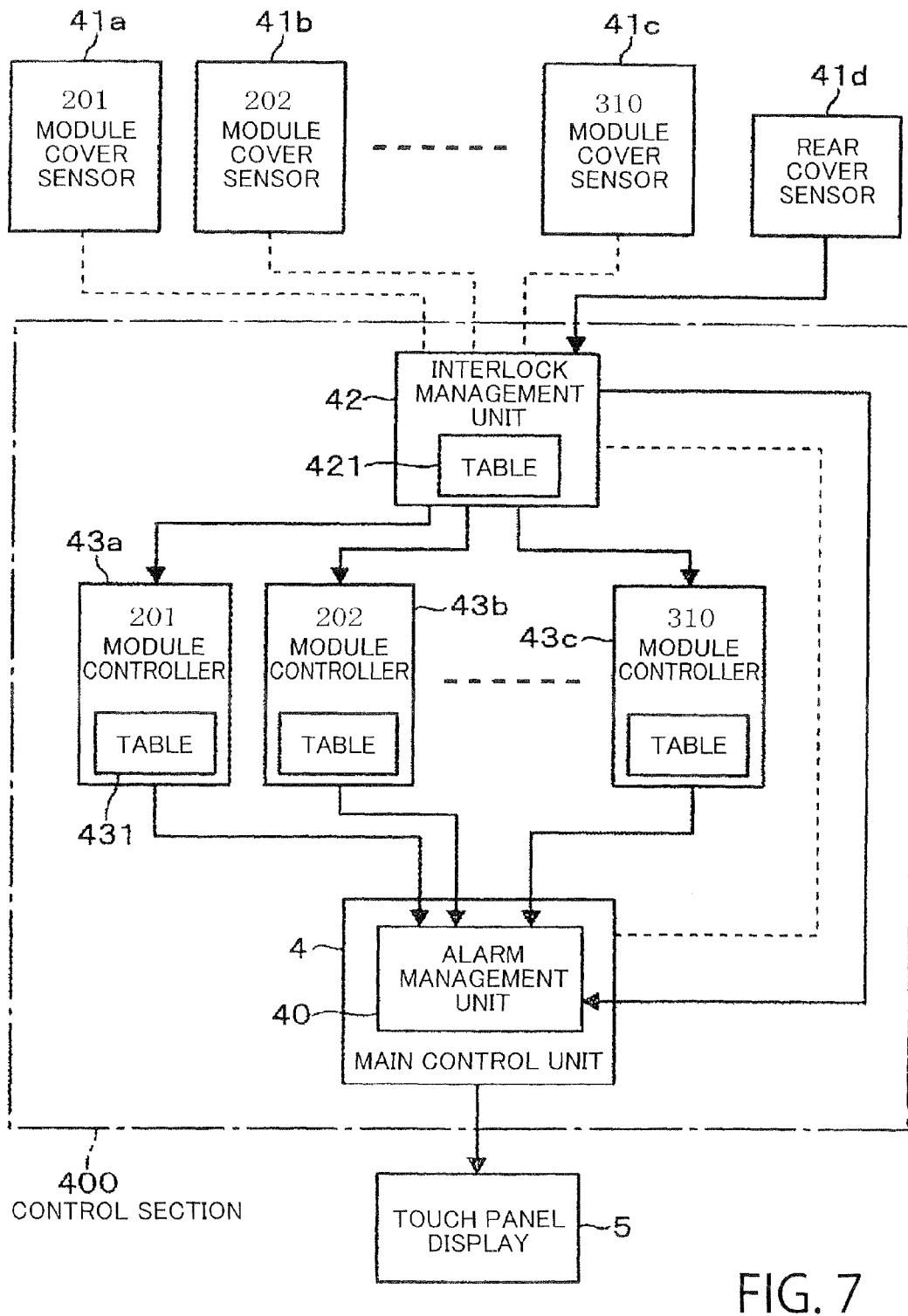
FIG. 7 is an explanatory diagram showing a first example of an operating state of the alarm triggering system.

When the PA rear cover sensor 41d detects the opening of the PA rear side cover 153 here, as shown by solid arrows in FIG. 7, the interlock management unit 42 outputs an interlock operation command to the module controllers 43a through 43c connected to the liquid processing modules 2 of the management numbers 201 through 210 and 301 through 310. As a result, the liquid processing modules 2 that are twenty in total are stopped, and an alarm corresponding to the operation of this interlock is output to the alarm management unit 40.

When the alarm management unit 40 accepts a large number of alarms and triggers them without arranging the same, the operator must execute the recovery operations for the individual alarms one by one as described in Background Art. Thus, the operator bears a large burden.

Therefore, in parallel with the alarms from the module controller 43a through 43c, the liquid processing apparatus 1 of the present embodiment outputs an alarm even from the interlock management unit 42. In addition, the alarm triggered based on the alarm from the interlock management unit 42 is defined as "parent alarm", and the alarm triggered based on the alarm from each of the module controllers 43a through 43c is defined as "child alarm". They are related to each other. As a result, the detection (detection of the PA rear side cover 153 being opened here) of a factor for which interlock is applied (interlock factor), and a plurality of alarms triggered based on the response (the operations of interlock to the liquid processing modules 2 here) to the interlock factor are grouped in association with one another.

Combining the plural alarms triggered in response to the detection of the interlock factor and the response to the interlock factor into one group in this manner makes it possible to collectively take necessary measures (the closing of the PA rear side cover 153 and recovery operation from the touch panel display 5) to the multiple alarms.

Figure 9:
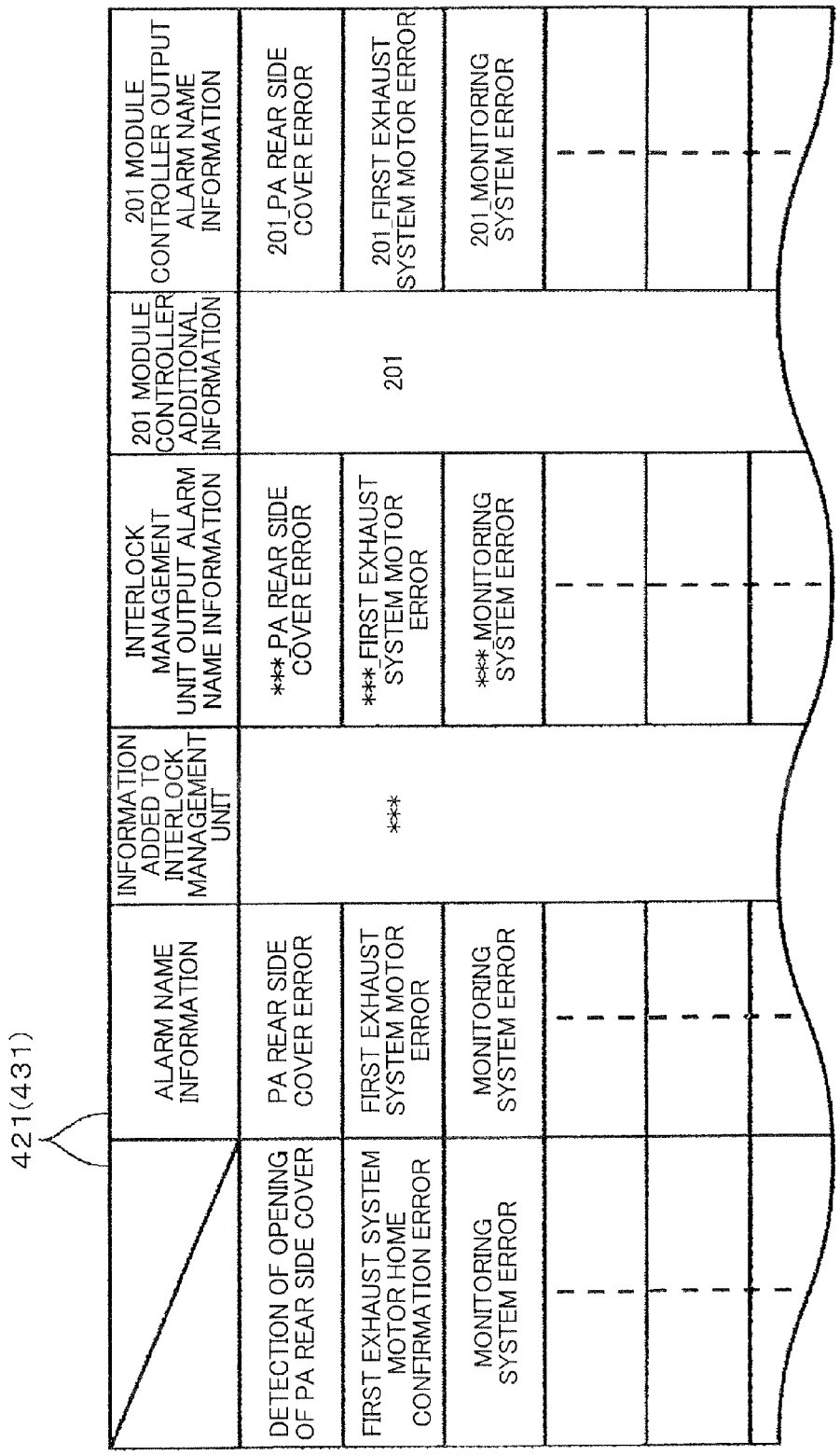
FIG. 9 is an explanatory view showing an example of an alarm that is output by the alarm triggering system.

As a method to associate the "parent alarm" and the child alarm with each other, there are considered various methods. In the present embodiment, as shown in alarm tables 421 and 431 of the two columns as viewed from the left of FIG. 9, a list of alarm names contained in the output alarms is stored in advance in the interlock management unit 42 and the module controllers 43a through 43c depending on the type of interlock factor. Then, in response to the interlock factor (the detection of opening of the PA rear side cover 153), the interlock management unit 42 selects an alarm name output from the list ("PA rear side cover error" shown in FIG. 9, for example) and outputs an alarm (alarm information) ("*_PA rear side cover error" shown in FIG. 9 for example) with information ("*") indicative of the parent alarm being added to the corresponding alarm name information to the alarm management unit 40.

On the other hand, the module controller 43a, which controls the liquid processing module 2 designated at the management number 201 outputs to the alarm management unit 40 an alarm (alarm information) ("201_PA rear side cover error") with information ("201" for the corresponding module, for example) different from the information ("***") indicative of the parent alarm being added to the same alarm name information ("PA rear side cover error") as that selected by the interlock management unit 42. Likewise, the module controller 43b of the liquid processing module 2 designated at the management number "202" outputs an alarm of "202_PA rear side cover error".

The alarm management unit 40 having received the alarms from the interlock management unit 42 and the module controllers 43a through 43c determines as the parent alarm, one added with a character string of "***" out of multiple alarms having a common alarm name, and on the other hand, determines as the child alarm, one added with other character strings ("201", "202", etc.). Thus, the alarm management unit 40 determines a parent-child relationship for the alarms, and groups the alarms placed in the parent-child relationship to allow the touch panel display 5 to display the same.

Thus, the interlock management unit 42 and the module controllers 43a through 43c output to the alarm management unit 40 the alarms (alarm information) including the alarm name information and information that can determine the alarm's parent-child relationship. Therefore, the alarm management unit 40 is capable of easily grouping the alarms having the common alarm name and extracting the parent alarm out of them. Therefore, a large number of alarms can be grouped and triggered in a short time.

As described above, the interlock management unit 42 has the function of receiving the detection signal (detection of the module side cover 151 being opened) for the interlock factor from each of the cover sensor 41a through 41d and outputting the alarm indicating that the interlock factor has been detected, as the parent alarm. Each of the module controllers 43a through 43c has the function of outputting the alarm indicating that interlock has been put to the corresponding module (interlock has been operated), as the child alarm.

Figure 8:
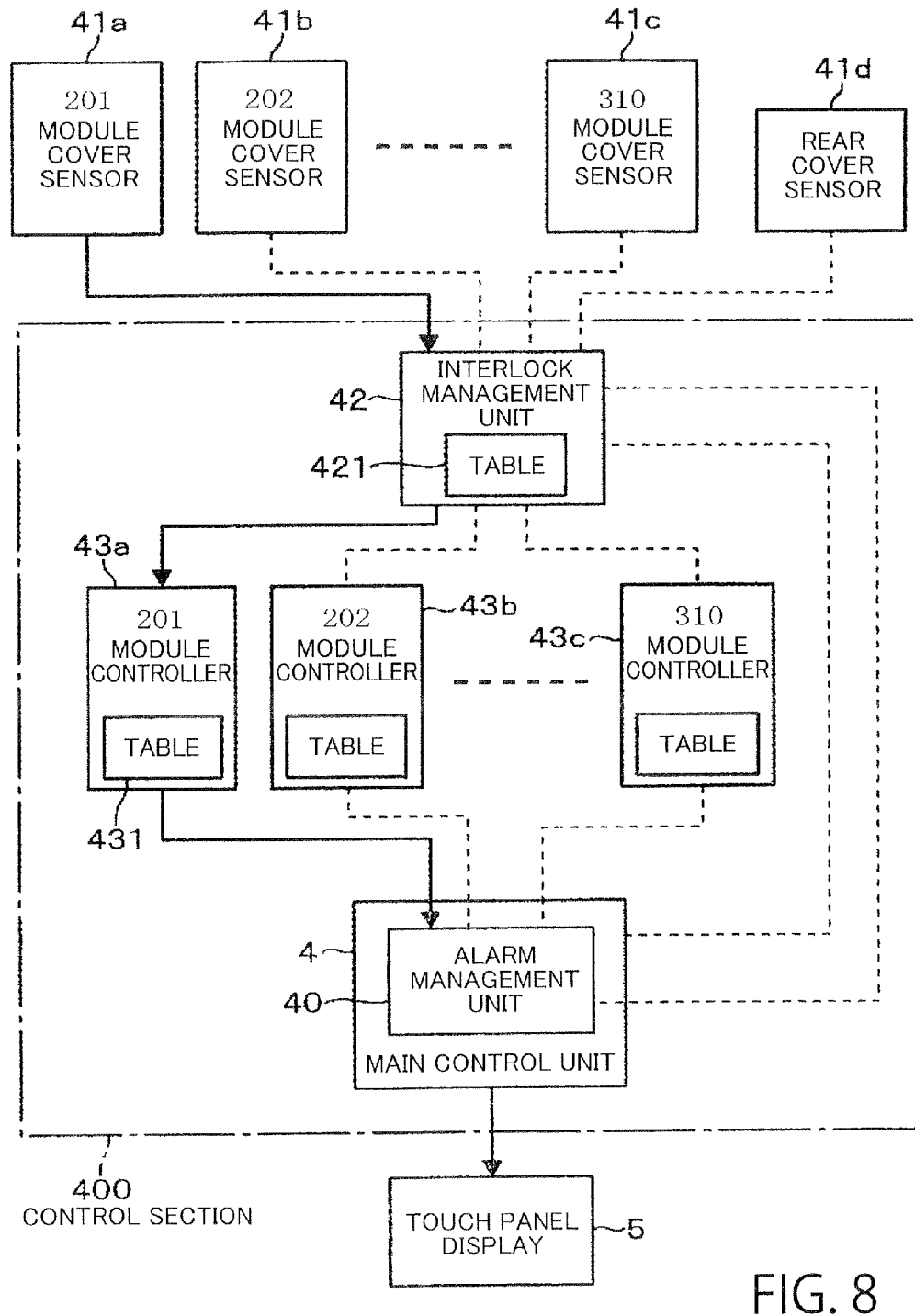
FIG. 8 is an explanatory diagram showing a second example of an operating state of the alarm triggering system.

On the other hand, as in the embodiment shown in FIG. 8, when it is detected that the module side cover 151 of the liquid processing module 2 of the management number 201 has been opened, it is only one liquid processing module 2 to stop by the operation of the interlock. The number of alarms triggered as a result is also small. Thus, in the present embodiment, for the interlock factor that only one alarm is output, a single alarm is output from the module controller 43a without outputting the parent alarm from the interlock management unit 42. In this case, information indicating that the alarm is a child alarm is not added to the alarm output from each of the module controllers 43a through 43c. Instead of the above, however, information indicating that the alarm is a child alarm is always added to the alarm output from each of the module controllers 43a through 43c. Then, it may be determined whether the child alarms should be grouped, according to whether the alarm management unit 40 has received a parent alarm from the interlock management unit 42.

Here, as shown enclosed by a dashed line in FIGS. 6 through 8, the interlock management unit 42, the module controllers 43a through 43c and the main control unit 4 (alarm management unit 40) configure a control section 400 of the liquid processing apparatus 1 as a whole.

The alarm management unit 40 is provided with a batch recovery function of giving a parent-alarm recovery instruction to a plurality of alarms grouped and displayed in a state in which the parent-child relationship is defined as above, thereby making it possible to collectively perform the recovery of child alarms as well. Specific examples illustrative of the triggering and recovery of alarms in this case will be described with reference to FIGS. 10 through 20.

Figure 10:
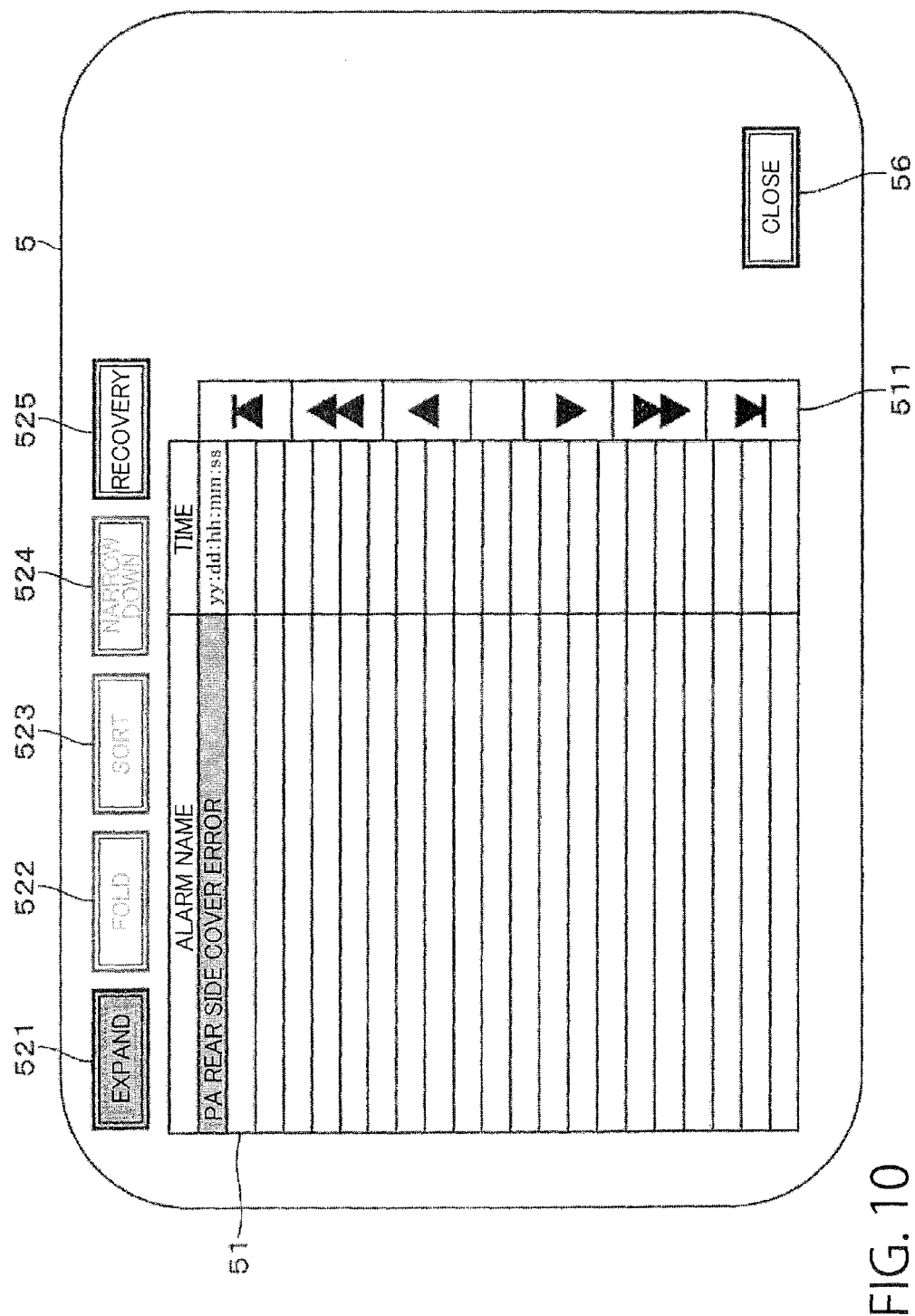
FIG. 10 is an explanatory diagram showing an alarm triggering screen of the liquid processing apparatus.

FIG. 10 shows an example of an alarm triggering screen displayed on the touch panel display 5 with the detection of the PA rear side cover 153 being opened. In the figure, reference numeral 51 is an alarm display unit that displays the alarm name of a triggered alarm and its triggering time side by side. By touching the display portion of the corresponding alarm name in the alarm display unit 51, the corresponding alarm can be selected. Reference numeral 511 is a scroll bar to move the display range of alarms where alarms more than the number that can be displayed at the same time on the alarm display unit 51 are activated.

Various operation buttons are displayed on the alarm triggering screen in FIG. 10. The expand button 521 is used when displaying the child alarms grouped with the parent alarm selected in the alarm display unit 51. On the other hand, the fold button 522 is used when the display of each child alarm is turned off and only the parent alarm is displayed.

The sort button 523 is used when sorting the alarms based on the sorting items set in advance. The narrow-down button 524 is used when displaying on the alarm display unit 51, only alarms each conforming to a predetermined narrow-down or squeezing item. The recovery button 525 is a button for displaying an operation area related to the recovery operation for the alarm selected in the alarm display unit 51. The screen switching button 56 is a button for closing the alarm activation or triggering screen and switching the display of the touch panel display 5 to, for example, the operation screen of the liquid processing apparatus 1.

Hereinafter, in each figure, the buttons in which frame lines and names are displayed in faint gray in the screen displayed on the touch panel display 5 indicate that the buttons are inoperable on the corresponding screen. Further, in each figure, the buttons filled with dark gray within their frames indicate that the buttons have been operated in the corresponding screen (be operated from this).

Figure 11:
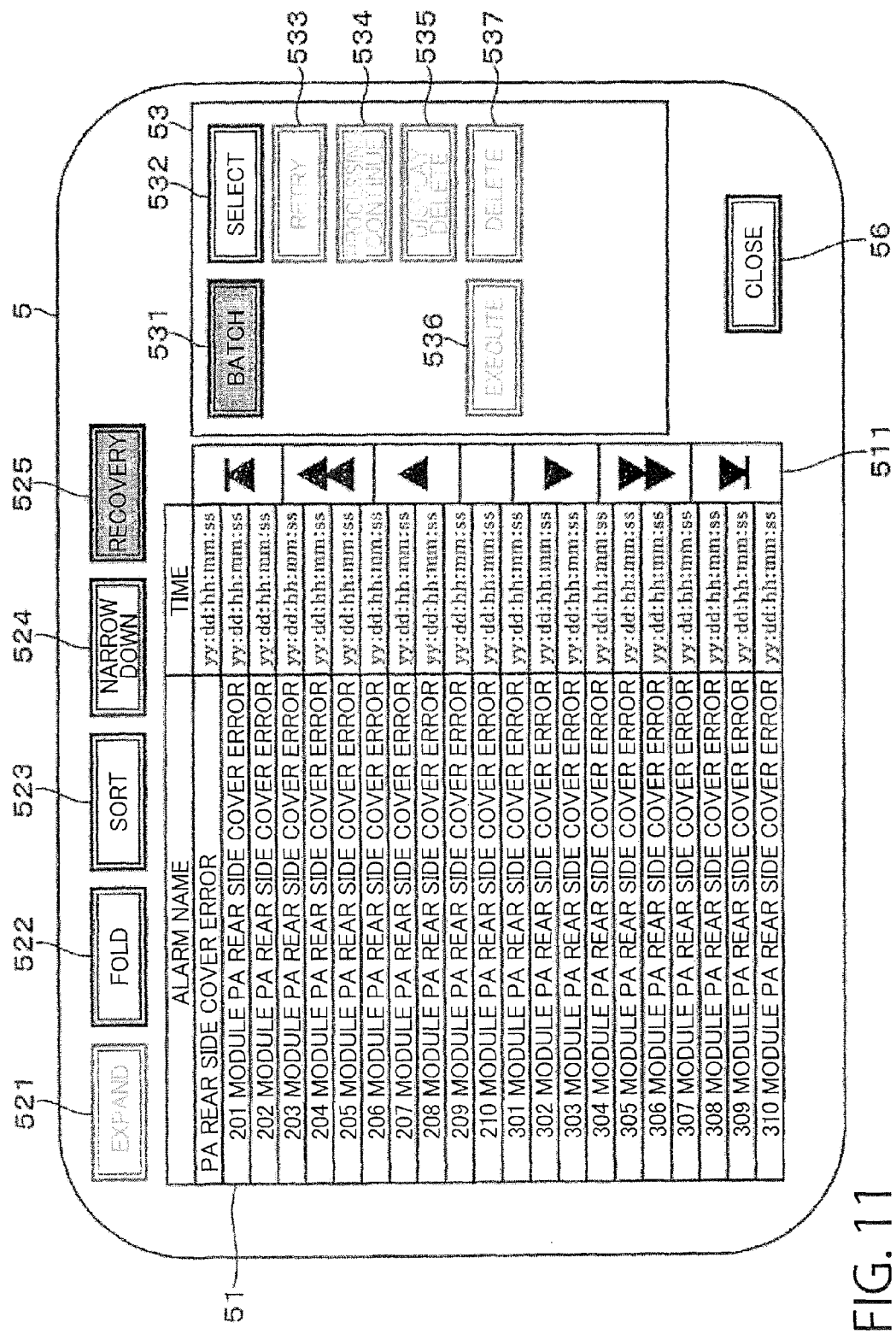
FIG. 11 is an explanatory diagram showing the alarm triggering screen.

When the corresponding parent alarm in the alarm display unit 51 in which the parent alarm of "PA rear side cover error" is displayed in FIG. 10, is selected and the expand button 521 is pressed, the child alarms placed in the parent-child relationship with the corresponding parent alarm are grouped and displayed together with the corresponding parent alarm as shown in FIG. 11. The alarm display unit 51 in the present embodiment displays, below the parent alarm, a description start position of the alarm name with being shifted to the right than the parent alarm to thereby indicate that the alarm is each child alarm.

As shown in FIG. 11, when the recovery button 525 is pressed, a recovery operation display unit 53 is displayed in the right area of the alarm display unit 51. A batch selection button 531 and an individual selection button 532 are displayed within the recovery operation display unit 53. When the batch selection button 531 is pressed, it is possible to select the parent alarm being selected in the alarm display unit 51 and all child alarms that are in parent-child relationships therewith. When the individual selection button 532 is pressed, one or more child alarms can individually be selected by individually touching the display areas (columns) of the alarm names of the child alarms displayed within the alarm display unit 51.

It has become possible to perform the three types of recovery operations in the recovery operation display unit 53 of the present embodiment. A retry button 533 is for giving instructions to retry whether the alarm activation factor is not detected (detection confirmation of PA rear side cover 153) after the alarm activation factor has been resolved (the PA rear side cover 153 has been closed, for example). A processing continue button 534 is for giving instructions to continue the processing set in advance. A display delete button 535 is intended to give instructions for only the deletion of the corresponding alarm. However, the type of recovery operation for each alarm is not limited to this. Other recovery operations may be set based on the design of the alarm triggering system.

Further, an execute button 536 is for instructing execution of recovery operations corresponding to the selected buttons 533 through 535. A delete button 537 is for instructing the operation of deleting the alarm selected in the alarm display unit 51 from targets for execution of the recovery operation.

Figure 12:
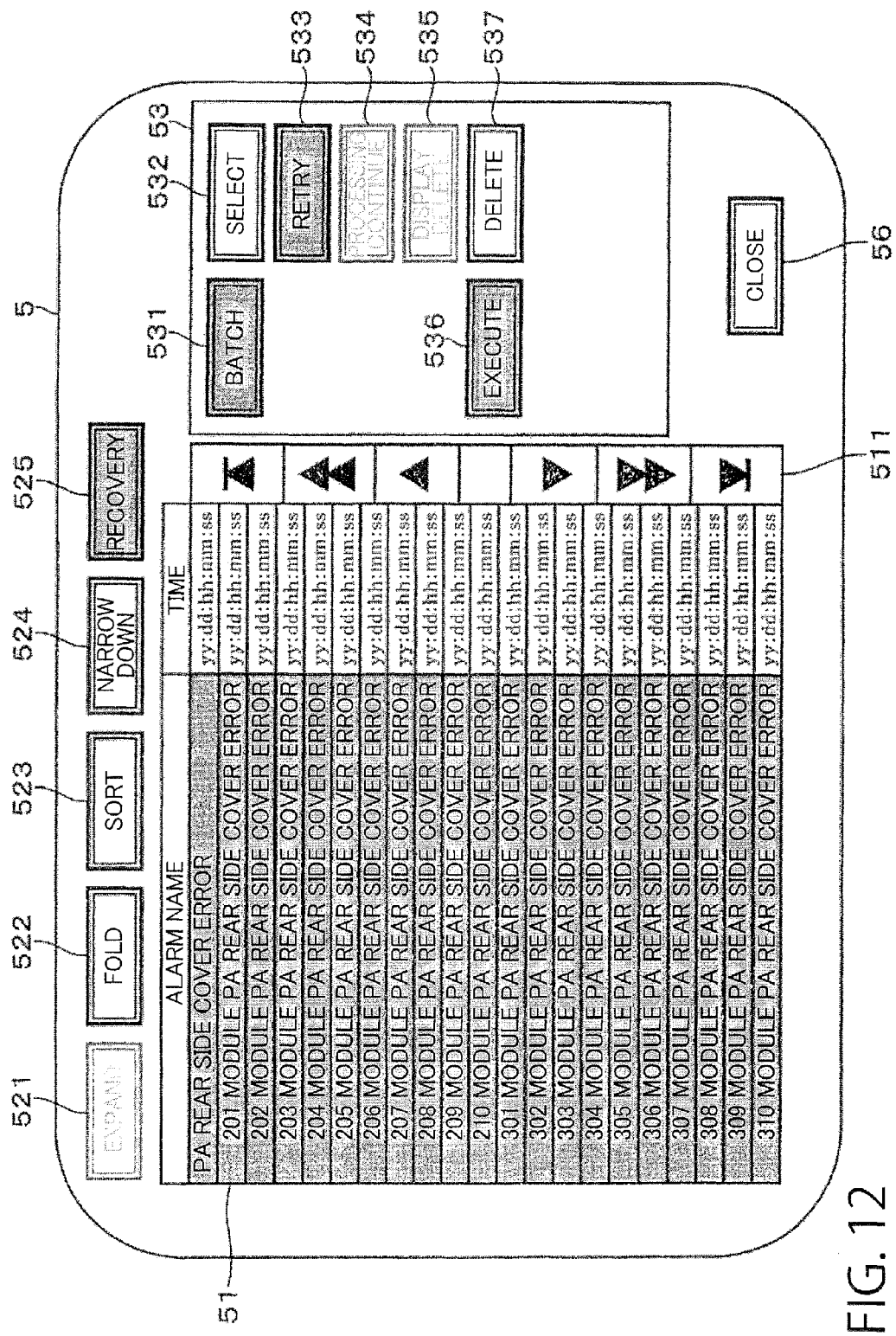
FIG. 12 is an explanatory diagram showing the alarm triggering screen.

When the batch selection button 531 of the recovery operation display unit 53 is pressed in the state of FIG. 11, all parent and child alarms displayed in the alarm display unit 51 are selected as shown in FIG. 12, and the buttons (one or more of 533 through 535) for the recovery operation executable for these selected alarms can be designated. Since it is necessary to perform action to close the PA rear side cover 153 when the alarm of "PA rear side cover error" is recovered, it is possible only to specify the retry button 533 for retrying the detection confirmation of the PA rear side cover 153 on the alarm triggering screen.

Figure 13:
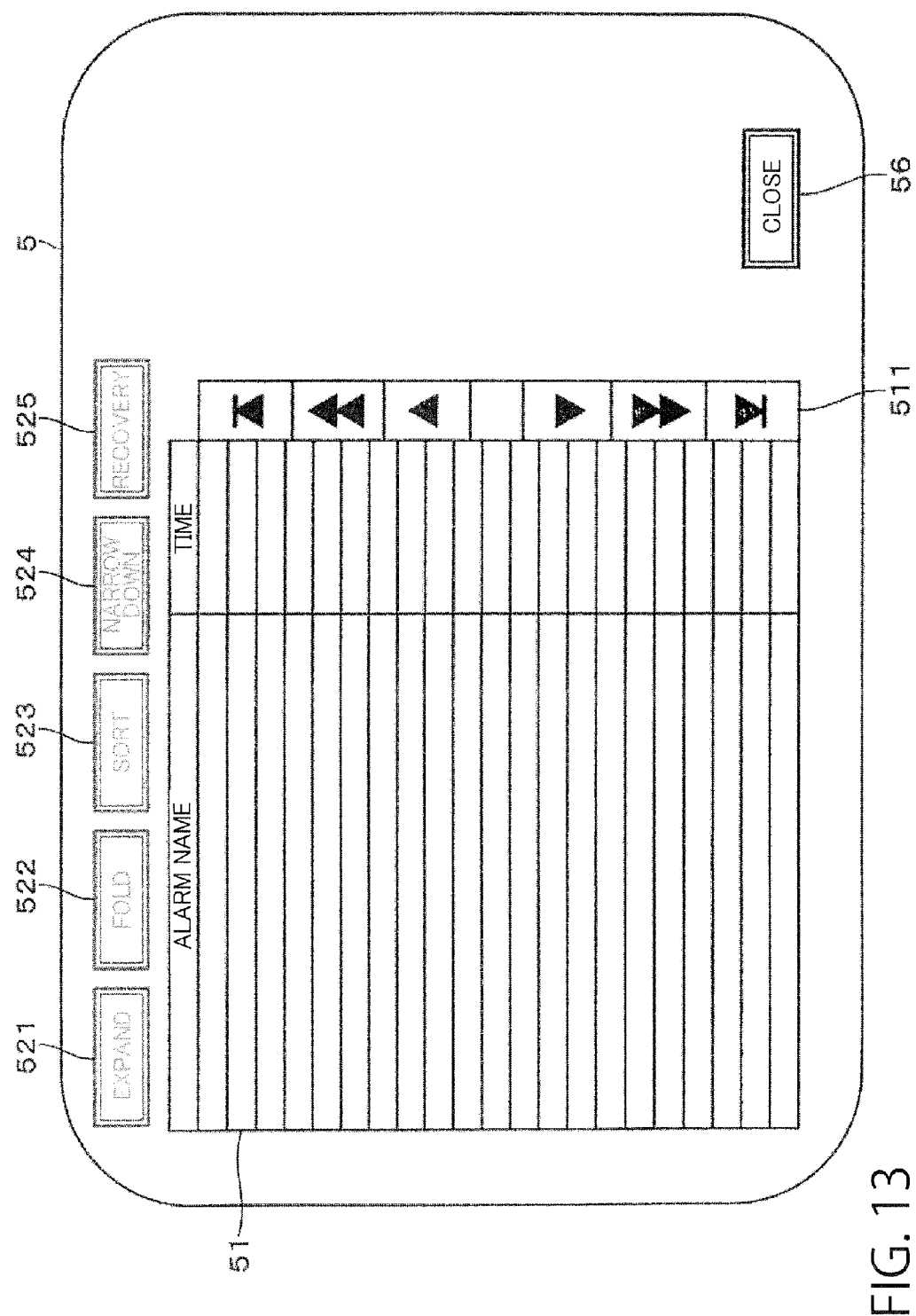
FIG. 13 is an explanatory diagram showing the alarm triggering screen.

Thus, when the retry button 533 is pressed and the execute button 536 is further pressed, a confirmation for continuity of the PA rear cover sensor 41*d* is performed by the interlock management unit 42 shown in FIG. 6. If a conducting state is confirmed, interlock is released and the state of triggering of the alarm is eliminated as shown in FIG. 13 (alarm is recovered).

Further, when the individual selection button 532 is pressed instead of the batch selection button 531 in the state of FIG. 11, each alarm can individually selected by touching the alarm name in the alarm display unit 51. When the name of the parent alarm is touched at this time, the corresponding parent alarm and child alarms associated therewith are also all selected so that a state similar to FIG. 12 is reached. On the other hand, when the name of each child alarm is touched, only the corresponding child alarm is selected (this results in a state in which the columns in the alarm display unit 51 displaying the corresponding child alarm names have been filled with dark gray). Thereafter, when the retry button 533 is pressed and then the execute button 536 is pressed, the corresponding child alarm is recovered (recovery).

As described above, the individual selection button 532 is used when the child alarm to recover independently from the recovery of the parent alarm is selected from the alarm display unit 51 in which the unselected parent and child alarms are listed as shown in FIG. 11. That is, it can be said that the batch selection button 531 and the individual selection button 532 assume a role as a selection unit for selecting whether to collectively perform the recovery operations of the parent alarm and all child alarms placed in the parent-child relationship or to individually perform the recovery of the child alarms.

Thus, by collectively selecting multiple alarms placed in a parent-child relationship to perform the recovery operation, the recovery operation can efficiently be carried out as compared with the case where the recovery operation is performed while individually selecting the individual alarms. On the other hand, there is, for example, a case where it is desired to maintain alarms of specific liquid processing modules 2 while remaining trigged due to reasons such as the repair of equipment and to prevent the liquid processing modules 2 from operating. Therefore, it is also possible to eliminate the specific alarms from the objects for the recovery operation in the alarm triggering screen of the present embodiment.

Figure 14:
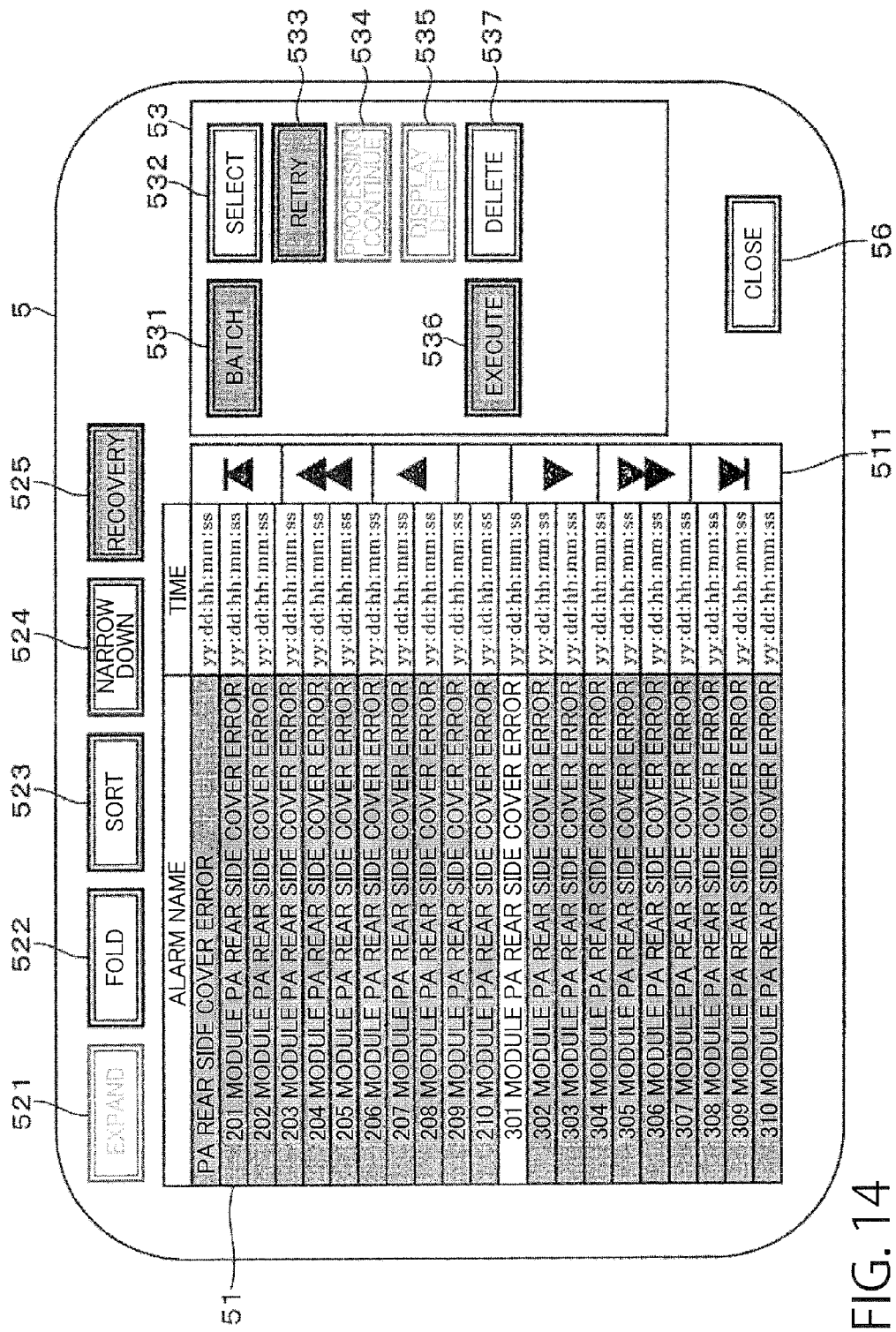
FIG. 14 is an explanatory diagram showing the alarm triggering screen.
Figure 15:
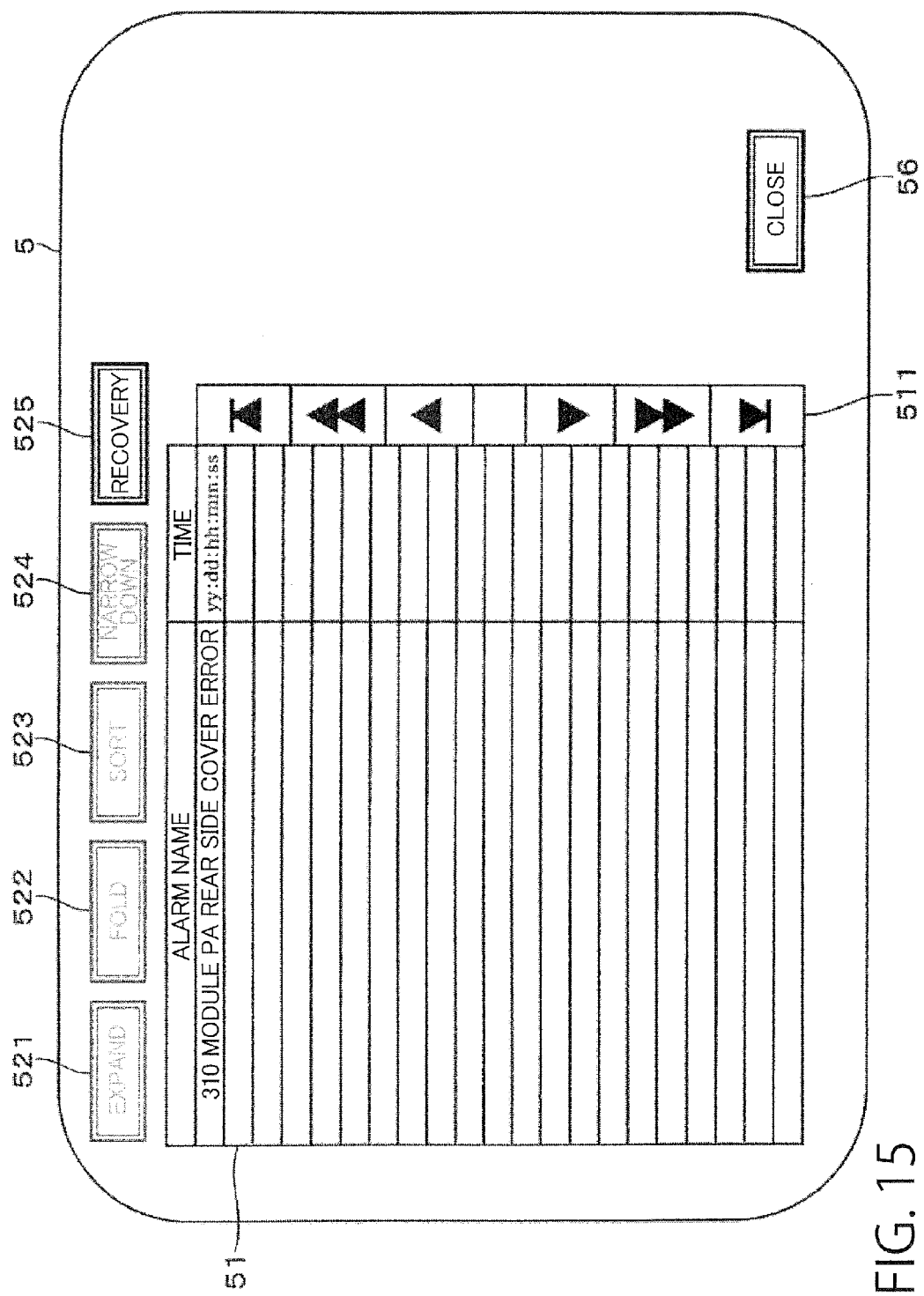
FIG. 15 is an explanatory diagram showing the alarm triggering screen.

In this case, when in the state shown in FIG. 12, the display portion of the alarm name for each alarm to be deleted on the alarm display unit 51 is touched and thereafter the delete button 537 is pressed, the selected state of the corresponding alarm is released as shown in FIG. 14 (the column to display the alarm name is shown in white in FIG. 14). Thereafter, when the retry button 533 is pressed, the recovery operation by the "retry button 533" is performed on only the selected parent and child alarms, thus resulting in a state in which only the previously selected and released child alarm is being singly triggered as shown in FIG. 15.

When the remaining child alarms are recovered (recovery), the recovery button 525 is pressed to display the recovery operation display unit 53, and the individual selection button 532 is pressed to select the alarm target for recovery, which has been displayed in the alarm display unit 51. Thereafter, when the retry button 533 and the execute button 536 are pressed, the selected alarm is recovered. Thus, all alarms are recovered, i.e., the state of triggering of all alarms is eliminated (FIG. 13).

Figure 16:
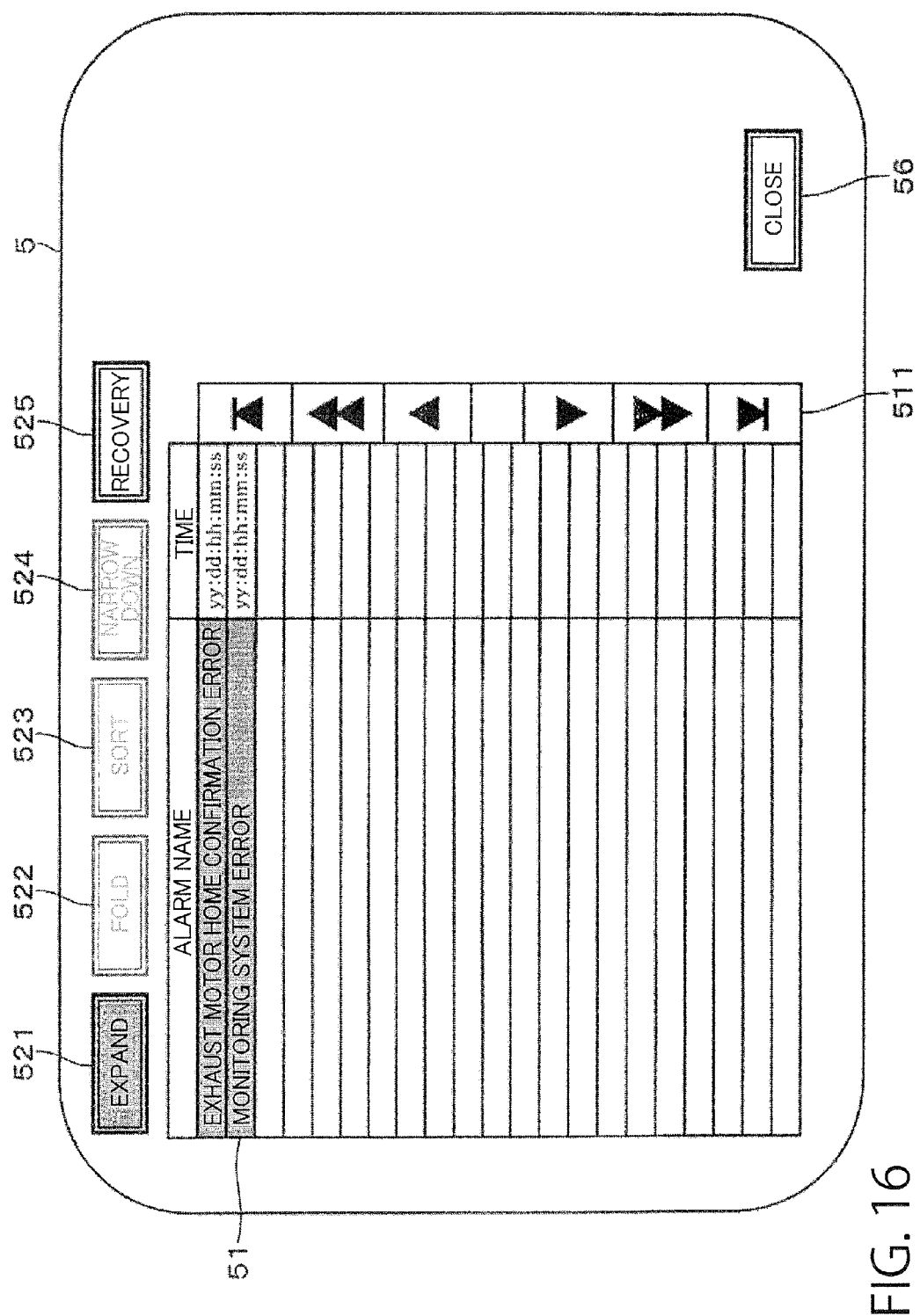
FIG. 16 is an explanatory diagram showing the alarm triggering screen.
Figure 17:
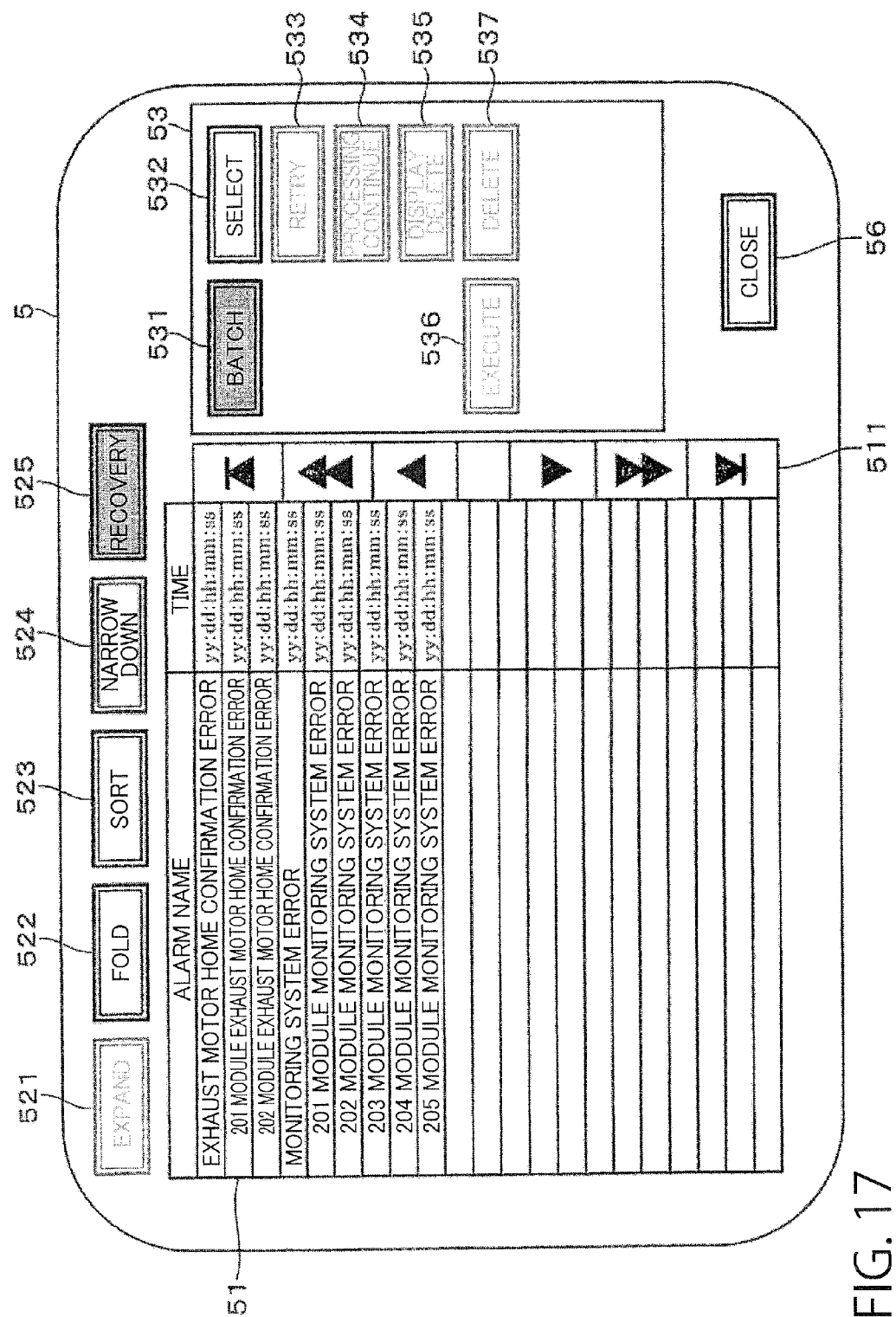
FIG. 17 is an explanatory diagram showing the alarm triggering screen.

FIGS. 16 and 17 show examples of an alarm triggering screen where a plurality of types of parent alarms are triggered. When both parent alarms are selected and the expand button 521 is pressed where the plurality of types of parent alarms are activated as shown in FIG. 16, child alarms corresponding to the respective parent alarms are grouped every parent alarm and displayed in the alarm display unit 51 as shown in FIG. 17.

In this state, when the recovery button 525 is pressed to display the recovery operation display unit 53, and the alarm name of the parent alarm for the group to be processed in block is touched after the batch selection button 531 is pressed, child alarms in the same group as the parent alarm are all selected, and the buttons for the recovery operations executable for these alarms become a state ready for operation. For example, in an "exhaust motor home confirmation error", it is necessary to adjust the origin of the motor for the exhaust system, whereas the operation of the retry button 533 for retrying the home confirmation is possible in the alarm triggering screen.

Then, when the retry button 533 is pressed and the execute button 536 is pressed, the home check for the exhaust motor is performed. If its origin is confirmed, then interlock is released and the selected alarm is recovered. When a plurality of parent alarms are however activated, the groups of alarms unselected during the previous recovery remain triggered. By performing an alarm batch selection and an executable recovery operation (for example, "processing continuation" in the example of "monitoring system error") even on these alarms, the triggered state of all alarms can be eliminated (refer to FIG. 13).

Further, when in the case where a plurality of parent alarms are simultaneously selected upon the batch selection of alarms and the recovery operation is performed, a plurality of types of alarms different in recovery operation for eliminating the alarm triggered state are simultaneously selected, it is possible to select a plurality of types of recovery operations even in the recovery operation display unit 53. In this case, for example, when the retry button 533 is pressed and the execute button 536 is pressed, alarms whose triggered states can be eliminated by the corresponding recovery operation (retry) disappear from the alarm display unit 51, and alarms whose triggered states cannot be eliminated by "retry" remain on the alarm display unit 51. Since the batch selection has already been performed on the alarms that remain at this time, the alarm triggered state of "monitoring system error" is eliminated if the processing continue button 534 is pressed and the execute button 536 is pressed. Incidentally, contrary to the example described above, the alarm triggered state of "monitoring system error" is eliminated when the recovery operation of "processing continuation" is performed ahead, and hence the alarm of "exhaust motor home confirmation error" remains.

Although the recovery operation executable for a kind of parent alarm and its child alarms has been set as one type in the example described above, a plurality of types of recovery operations capable of eliminating alarms may be set. In this case, by executing any of the plural selectable recovery operations, alarms whose triggered states can be eliminated by the recovery operation disappear.

Furthermore, there is also considered a case where it is necessary to perform the recovery operations different in type on a plurality of child alarms grouped under one common parent alarm. For example, when plural types of interlock that each liquid processing module 2 is stopped and PA (second transfer module 143) is stopped, are activated with respect to the common alarm activation factors (e.g., detection of the PA rear side cover 153 being opened), there is a case where such setting is made. In this case, even after the recovery operation for eliminating the triggering of the parent alarm has been executed, it is possible to accept the execution of a recovery operation without having to reselect the remaining child alarms if the batch selection is performed earlier.

Figure 18:
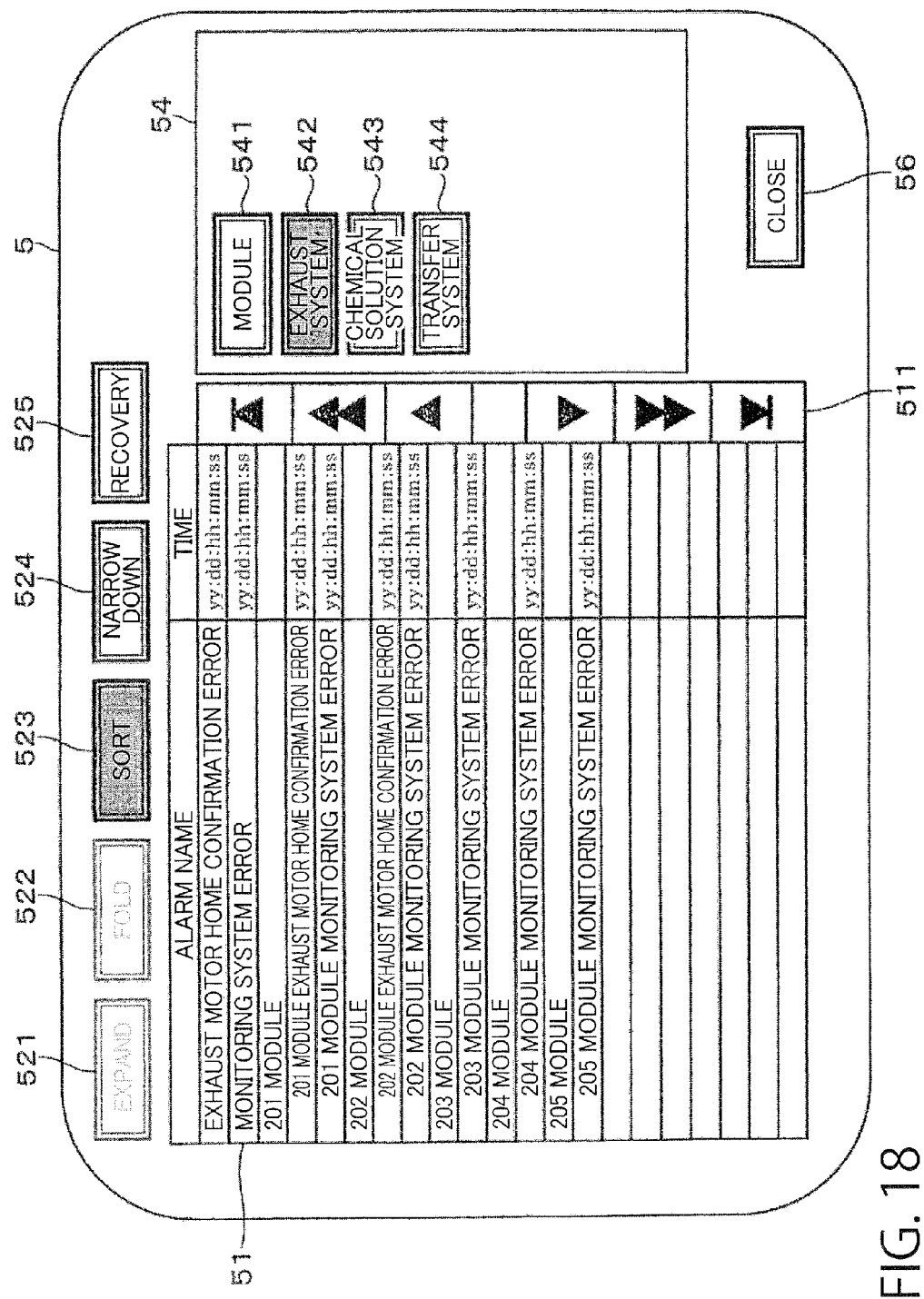
FIG. 18 is an explanatory diagram showing the alarm triggering screen.

The function of the sort button 523 will next be described with reference to FIGS. 18 and 19. In FIG. 16, these parent alarms are being triggered. In this case for example, when the expand button 521 is pressed to specify the plurality of types of parent alarms and thereafter the sort button 523 is pressed, a sort operation display unit 54 is displayed in the right area of the alarm display unit 51 as shown in FIG. 18. In the present example, there are displayed a module sort button 541 to sort (rearrange) multiple alarms with a "related liquid processing module" as the sort item, an exhaust system sort button 542 to sort the same with a "related exhaust system" as the sort item, a chemical solution system sort button 543 to sort the same with a "related chemical solution supply system" as the sort item, and a transfer system sort button 544 to sort the same with a "related PA transfer system" as the sort item.

Here, for example, when the module sort button 541 is pressed, as shown in FIG. 18, the respective alarms are sorted in such a manner that they are grouped for each management number of related liquid processing modules 2 and the grouped alarms are displayed in the management number order of the liquid processing modules 2. There are displayed in the alarm display unit 51 after execution of sorting, sort items such as "201 module" and "202 module", and management numbers for liquid processing modules, which become the basis of sorting. Then, the description start positions of alarm names at which one or more alarm names are displayed under the management numbers of the respective liquid processing modules, are displayed with being shifted to the right than the management numbers of the liquid processing modules. Thus, this indicates that the corresponding alarms are alarms related to the liquid processing modules described above. Further, in the present example, parent alarms unrelated to any liquid processing module 2 are collectively displayed on the top stage of the alarm display unit 51 aside from the child alarms sorted according to the sort items. Incidentally, if the sort button 523 is pressed again, then the selection state of the sort button 523 is released, so that the display of the alarm display unit 51 is returned to its original state (in this case, the display of the sort operation display unit 54 also disappears).

When the recovery button 525 is pressed in the state shown in FIG. 18 to display the recovery operation display unit 53 and the batch selection button 531 is pressed, alarms placed in a parent-child relationship are collectively selected while the alarms displayed in the alarm display unit 51 remain in a sorted state. Then, when a recovery operation corresponding to the collectively selected alarms is carried out, the activation state of the collectively selected alarms is eliminated.

Figure 19:
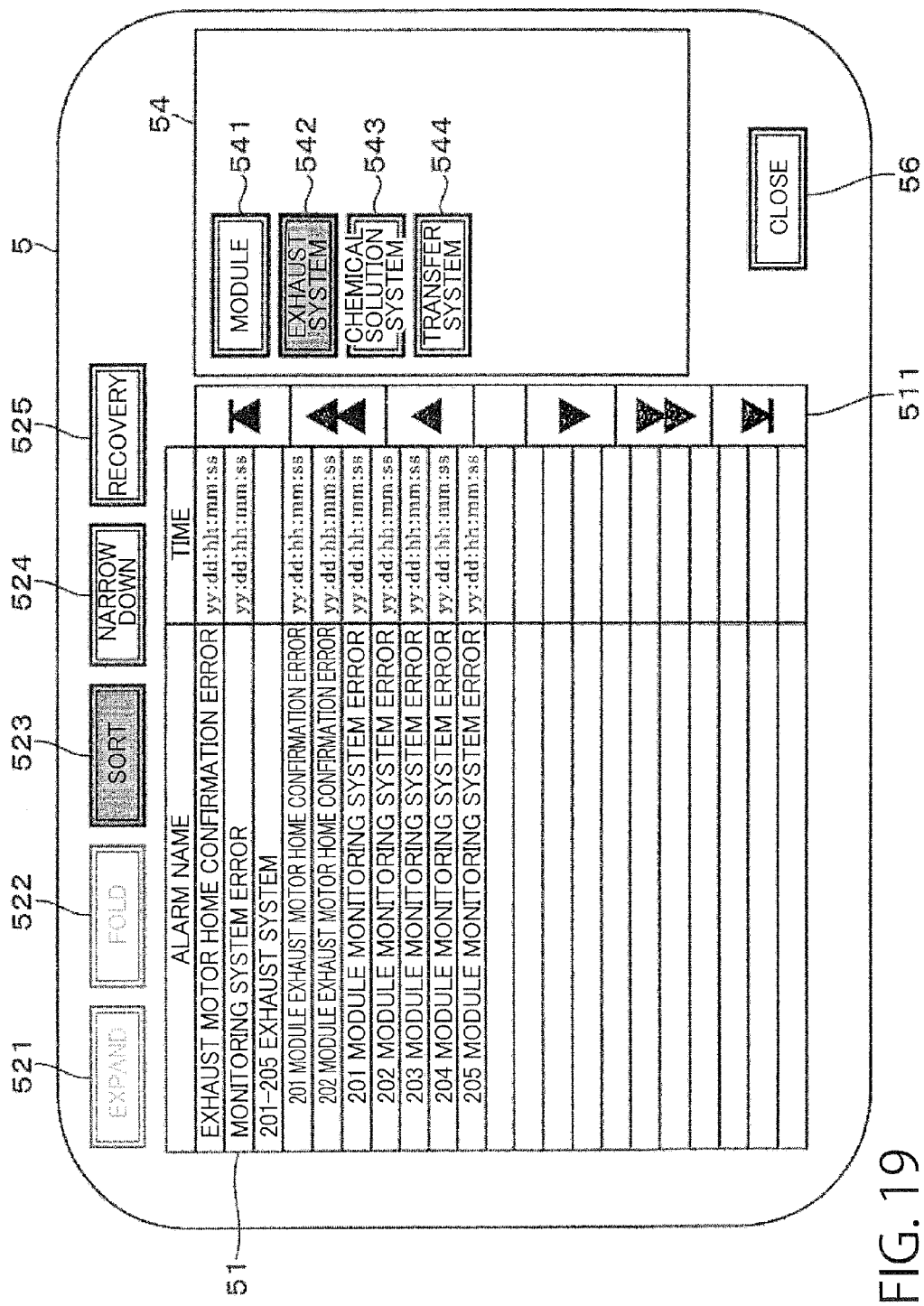
FIG. 19 is an explanatory diagram showing the alarm triggering screen.

FIG. 19 shows a display example in the case where the alarms are sorted with the "exhaust system concerned" showing the grouping in FIG. 5 as a sort item. There are displayed in the alarm display unit 51, sort items to specify the exhaust system that has become the basis of sorting, and related management numbers ("201-205 exhaust system") of liquid processing modules 2. When in this state, the recovery button 525 is pressed to display the recovery operation display unit 53, the batch selection of alarms placed in the parent-child relationship and the execution of the recovery operation are enabled. Even in this case, it is possible to continuously perform the batch selection of the alarms placed in the parent-child relationship and the recovery operation on the remaining alarms unsorted. Dual explanations and illustrations about those will however be omitted.

Here, the sort items displayed on the sort operation display unit 54 are not limited to those shown in FIGS. 18 and 19, but may be changed as appropriate depending on the type of trigged alarm and the like, for example. In the above description, it has been explained that the alarms related to the liquid processing modules 2 have been displayed in the alarm display unit 51. Therefore, the sort items related to the liquid processing modules 2 have been listed in the sort operation display unit 54. Apart from this example, when alarms related to the first wafer transfer module 121 and the second wafer transfer module 143 are activated in plural form, for example, sort items such as a "power supply system" may be provided.

Further, the sort items are not limited to those based on the type of equipment such as "module" or "exhaust system" enumerated in FIGS. 18 and 19. For example, "date", "alarm severity" and so on may be provided as sort items. In this case, it may be possible to switch and display the list of selectable sort items.

By touching the information about the sort items displayed in the alarm display unit 51 upon execution of the recovery operation, a plurality of alarms related to the corresponding sort items may be set so as to be collectively selectable.

Figure 20:
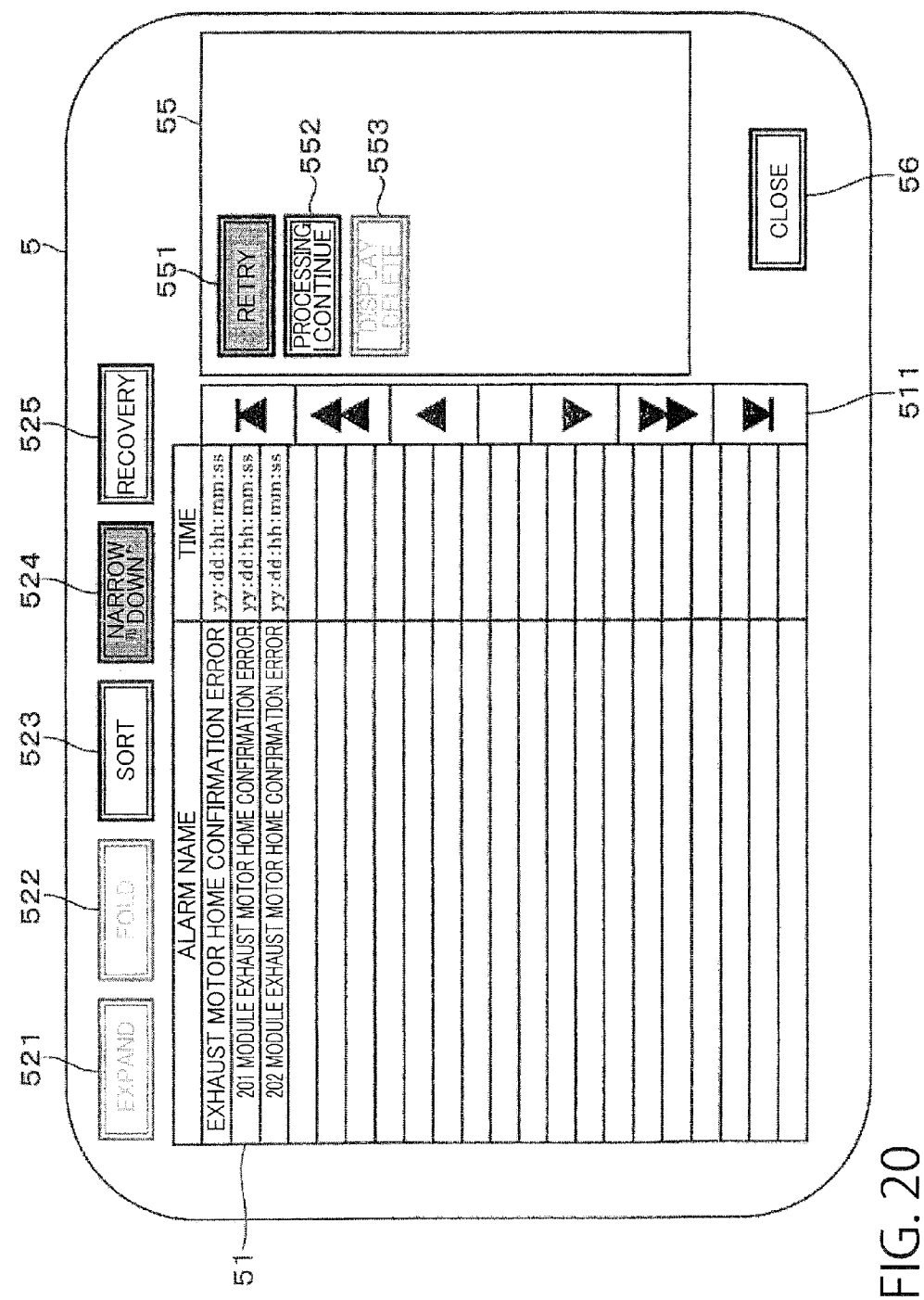
FIG. 20 is an explanatory diagram showing the alarm triggering screen.

Then, a description will be made of the function of narrow-down button 524 with reference to FIG. 20. When both of the plurality of types of parent alarms shown in FIG. 16 are selected where these parent alarms are being triggered and the expand button 521 is pressed and thereafter the narrow-down button 524 is pressed, a narrow-down operation display unit 55 is displayed in the right area of the alarm display unit 51 as shown in FIG. 20. In the present example, there have been displayed three types of buttons: a retry narrow-down button 551, a processing continue narrow-down button 552, and a display delete narrow-down button 553. These buttons are configured to narrow down the alarms depending on the types of the recovery operations. Then, there are displayed those available within these three types of narrow-down buttons 551 through 553, depending on the type of alarm displayed in the alarm display unit 51.

For example, when the retry narrow-down button 551 is selected, as shown in FIG. 20, only an alarm whose triggered state can be eliminated by the recovery operation of "retry" is displayed in the alarm display unit 51. The point that when the recovery button 525 is thereafter pressed to display the recovery operation display unit 53, the batch selection and recovery operation for each alarm placed in a parent-child relationship can be performed, is similar to the above-described example that performs the batch selection after the sort operation has been performed.

When the recovery operation is executed for all alarms narrowed down and displayed, the alarms displayed in the alarm display unit 51 are eliminated. When the narrow-down button 524 is repressed from this state, the selection state of the corresponding narrow-down button 524 is released so that an unrecovered alarm being in activation is displayed.

Here, the narrow-down items displayed in the narrow-down operation display unit 55 are not limited to the contents of the recovery operation listed in FIG. 20. For example, the narrow-down items such as "alarm severity" may be set. The narrow-down items may be set to allow for switching and display.

Also the overlap selection of the sort button 523 and the narrow-down button 524 may be made possible. In this case, squeezing according to the recovery operation may be performed after sorting the alarms being in triggering as shown in FIGS. 18 and 19, for example. Alternatively, sorting may be performed after the squeezing.

According to the liquid processing apparatus 1 according to the present embodiment, the below advantages are achieved.

The alarm management unit 40 determines the parent-child relationship between the parent alarm indicating that interlock to be applied has been detected, and each child alarm indicating that the interlock has been put to each module, and groups the parent alarm and the child alarms placed in the parent-child relationship to display the same in the alarm display unit 5. It is therefore possible to collectively perform the recovery operation on the information about the grouped alarms and achieve labor saving in an alarm recovery.

Figure 21:
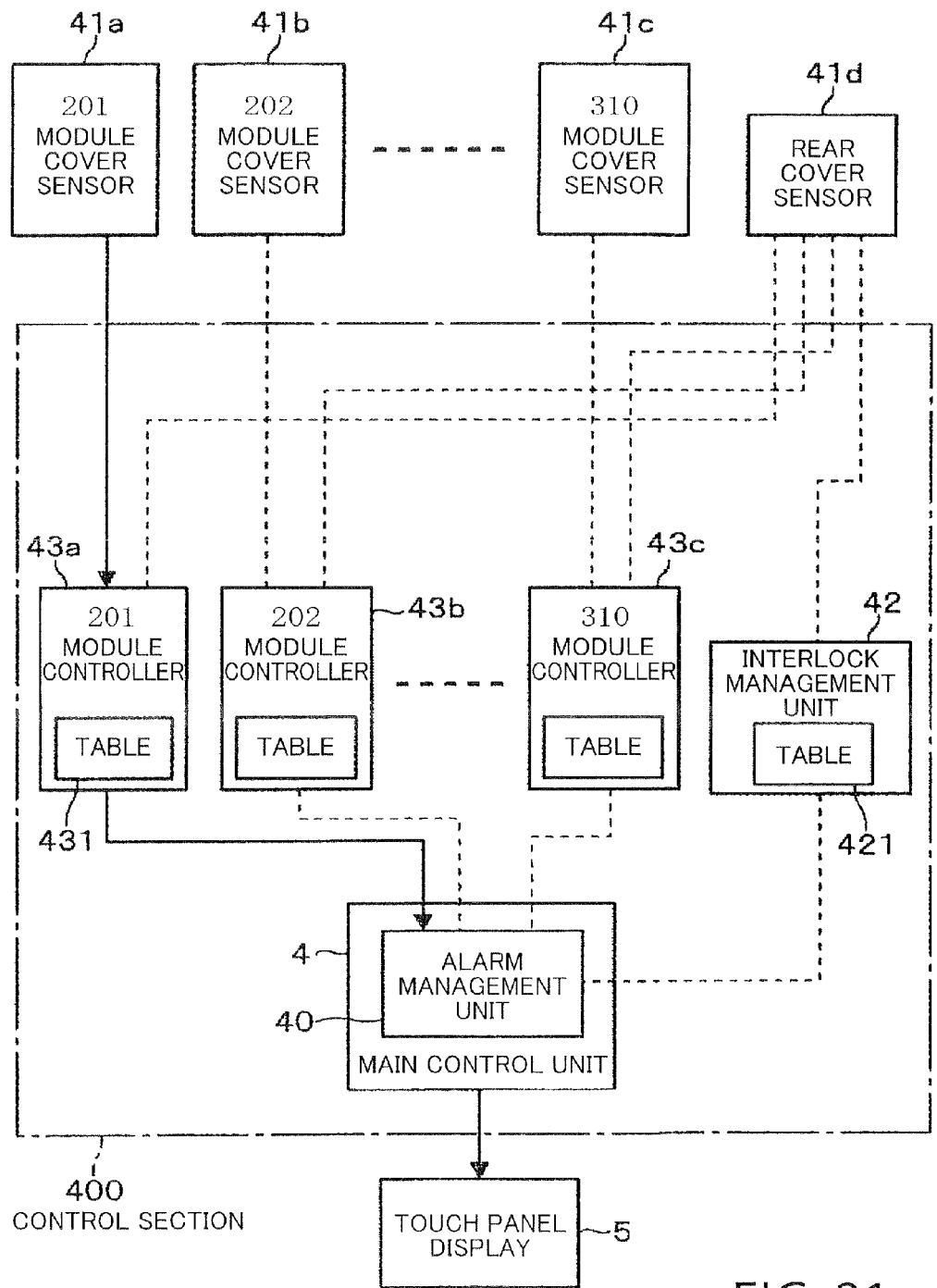
FIG. 21 is an explanatory diagram showing a first example of an operating state of another alarm triggering system.
Figure 22:
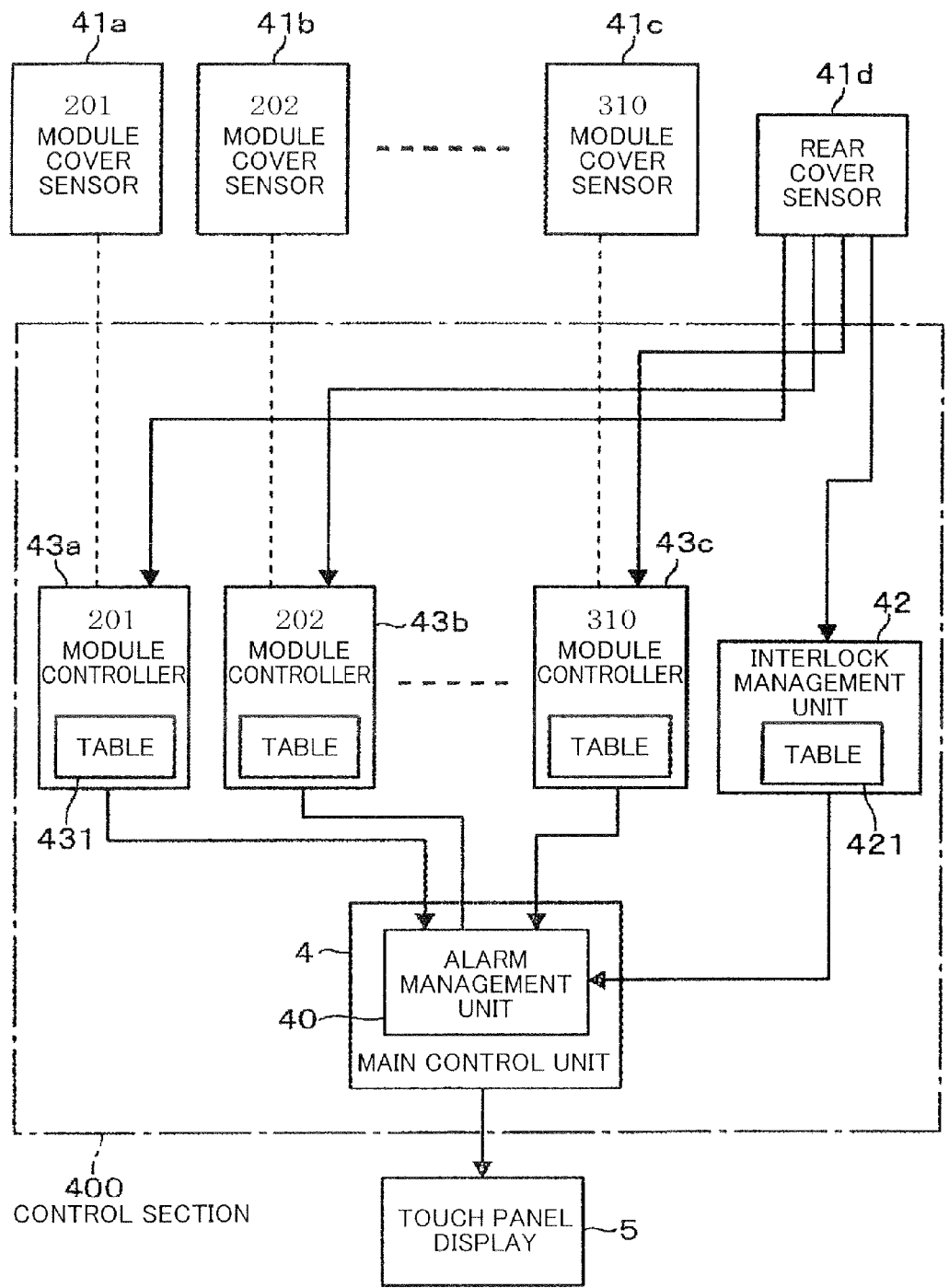
FIG. 22 is an explanatory diagram showing a second example of an operating state of another alarm triggering system.

In the above embodiment, the respective module controllers 43*a* through 43*c* have put interlock to the respective modules, based on the activation or operation command of the interlock management unit 42 as shown in FIG. 6, but are not limited thereto. As shown in FIGS. 21 and 22 for example, when the module controllers 43*a* through 43*c* directly confirm the conducting state of the PA rear cover sensor 41*d* and the module cover sensors 41*a* through 41*c* (i.e., the module controllers directly receive the detection signals from the sensors) and detect that the PA rear side cover 153 or the module side cover 151 has been opened, the interlock may be put to the modules, based on the determination of the module controllers 43*a* through 43*c*. Even in this case, the interlock means is constituted by the interlock management unit 42 and the module controllers 43*a* through 43*c*.

In this case, when it is in a state in which it has been detected that the PA rear side cover 153 is being opened, the interlock management unit 42 shown in FIG. 21 executes only the operation of outputting a parent alarm to the alarm management unit 40 and seems not to be involved in the activation of the interlock. The corresponding figure however shows part of the interlock operating system of the liquid processing apparatus 1 as described in FIG. 6. The interlock management unit 42 has the function of outputting the operation command of the interlock to other modules (e.g., the first wafer transfer module 121 or the second wafer transfer module 143) not shown in FIG. 21. It may however be configured to run only the operation of outputting the parent alarm to the alarm management unit 40 by the interlock management unit 42 and putting the interlock to each module according to the determination of each of the module controllers.

Even in the block diagrams shown in these FIGS. 21 and 22, the interlock management unit 42, the module controllers 43*a* through 43*c* and the main control unit 4 (alarm management unit 40) constitute the control section 400 of the liquid processing apparatus 1 as a whole.

Here, the configuration of the interlock management unit 42, the module controllers 43*a* through 43*c* and the alarm management unit 40 in the control section 400 is not limited to the examples shown FIGS. 6 through 8 and FIGS. 21 through 22. For example, the main control unit 4 may be allowed to have the functions of both the alarm management unit 40 and the interlock management unit 42. As with the interlock management unit 42 in each drawing, the function of the alarm management unit 40 may be held in an in-situ type microcomputer. Further, the respective functions of the interlock management unit 42, the module controllers 43*a* through 43*c* and the alarm management unit 40 may be provided in a plurality of microcomputers (or controllers) in a distributed form. That is, the functions of the interlock management unit 42, the module controllers 43*a* through 43*c* and the alarm management unit 40 may be included in a control device group comprising the microcomputer, the controllers and the like that configure the control section 400 of the liquid processing apparatus 1.

In each embodiment described above, the identification information ("*" in the case of the parent alarm and the management numbers "201", "202" and so on of the liquid processing modules 2 in the case of the child alarms) are added to the common alarm name to thereby make it possible to distinguish between the parent and child alarms. The method for identifying the parent-child relationship of the alarms is not however limited thereto. For example, the interlock management unit 42 and the module controllers 43***a* through 43*c* may output to the alarm management unit 40 alarms including alarm name information having no identification information attached thereto. In this case, the alarm management unit 40 identifies the modules that have output the corresponding alarm information, and identifies alarm information output from the interlock management unit 42 as the parent alarm and alarm information output from each of the module controllers 43*a* through 43*c* as the child alarm. In this case, as information that can be used to identify each module that has output information, there may be mentioned a MAC (Media Access Control) address and the like.

Incidentally, the target for interlock application is not limited to the liquid processing modules 2 shown in FIGS. 7, 21 and the like. For example, it is also possible to put interlock to a plurality of PA (second wafer transfer module 143) when the rear cover sensor 41*d* is opened.

Furthermore, the substrate processing apparatus to which the present invention is applied is not limited to the liquid processing apparatus 1 which performs the cleaning of the wafer W. The present invention can be applied to various substrate processing apparatuses equipped with modules to which interlock has been put as needed, such as a spin coating module and a heating module provided in a coating/development apparatus that applies a resist solution onto a wafer W, a glass substrate or the like and performs post-exposure development; a film deposition module for a film deposition apparatus that performs a film growth by CVD (Chemical Vapor Deposition), ALD (Atomic Layer Deposition) or the like; a processing module such as an etching apparatus or an ashing apparatus using plasma; and a transfer module provided in the apparatus described above.

The invention claimed is:

1. A substrate processing apparatus equipped with a plurality of modules, comprising:
    a detection unit that detects a factor for which interlock is applied to one or more of the plurality of modules, and that outputs a detection signal;
    interlock means that, based on the detection signal output from the detection unit, applies interlock to the module to be interlocked where the factor has occurred; and
    an alarm management unit that determines a parent-child relationship between a parent alarm and a child alarm or alarms, and that causes a display unit to display in a grouped manner the parent alarm and the child alarm or alarms having the parent-child relationship, the parent alarm indicating that the factor for which the interlock is applied has been detected, while the child alarm indicating that the interlock has been applied to the module, wherein the alarm management unit has a batch recovery function of collectively recovering the parent and child alarms in the parent-child relationship displayed in the grouped manner.

2. The substrate processing apparatus according to claim 1, wherein the interlock means includes:

an interlock management unit that, based on the detection signal output from the detection unit, outputs an interlock instruction signal to the module to be interlocked if the factor has occurred, and outputs the parent alarm to the alarm management unit, and module controllers, provided in the respective modules, that each applies interlock to the corresponding module, based on the interlock instruction signal from the interlock management unit, and that each outputs the child alarm associated with the corresponding module to the alarm management unit.

3. The substrate processing apparatus according to claim 1, wherein the interlock means includes:

an interlock management unit that, based on the detection signal from the detection unit, outputs the parent alarm to the alarm management unit if the factor has occurred, and module controllers, provided in the respective modules, that each applies interlock to the corresponding module, based on the detection signal received from the detection unit, and that each outputs the child alarm associated with the corresponding module to the alarm management unit.

4. The substrate processing apparatus according to claim 3, wherein the module controllers are provided to directly receive the detection signals from the detection unit.

5. The substrate processing apparatus according to claim 1, wherein the alarm management unit has an individual recovery function in addition to the batch recovery function, the individual recovery function allowing a recovery of each child alarm independently from a recovery of the parent alarm, and wherein the substrate processing apparatus further includes a selection unit that selects execution of the batch recovery function or the individual recovery function.

6. The substrate processing apparatus according to claim 2, wherein the module provided with the module controller is a processing module for performing processing on a substrate.

7. An alarm management method of a substrate processing apparatus having a plurality of modules, comprising:

detecting a factor for which interlock is applied to one or more of the plurality of modules, and outputting a detection signal;

sending a parent alarm indicating that the factor for which the interlock is applied has been detected to an alarm management unit;

applying, based on the detection signal, interlock to the module to be interlocked if the factor has occurred;

sending a child alarm indicating that the interlock has been applied to the module to be interlocked, to the alarm management unit;

determining a parent-child relationship between the parent and child alarms by the alarm management unit, and causing a display unit to display in a grouped manner the parent alarm and the child alarm or alarms which are determined to have the parent-child relationship; and in accordance with an input of batch recovery instructions to the alarm management unit by an operator, executing by the alarm management unit a batch recovery to collectively recover the parent and child alarms having the parent-child relationship, which are displayed in a grouped manner.

8. The method according to claim 7, further comprising:

causing the display unit to display an indication to prompt an operator to select a batch recovery or an individual recovery by the alarm management unit, and executing, upon selection, by the alarm management unit a batch recovery for collectively recovering parent and child alarms having the parent-child relationship displayed in a grouped manner, or an individual recovery for performing recovery of each child alarm independently from recovery of the parent alarm.

9. A non-transitory storage medium storing a computer program used in a substrate processing apparatus having a plurality of modules, wherein the program includes steps for performing the method according to claim 7.

* * * * *